US012628004B2

(12) United States Patent
Zhang et al.

(10) Patent No.: US 12,628,004 B2
(45) Date of Patent: *May 12, 2026

(54) METHOD FOR ADDITION AND CHANGE OF CONDITIONAL PRIMARY CELLS IN A SECONDARY CELL GROUP

(71) Applicant: ZTE CORPORATION, Shenzhen (CN)

(72) Inventors: Mengjie Zhang, Shenzhen (CN); He Huang, Shenzhen (CN); Jing Liu, Shenzhen (CN); Li Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 440 days.

This patent is subject to a terminal disclaimer.

(21) Appl. No.: 17/969,911

(22) Filed: Oct. 20, 2022

(65) Prior Publication Data

US 2023/0111427 A1     Apr. 13, 2023

Related U.S. Application Data

(63) Continuation of application No. PCT/CN2020/106098, filed on Jul. 31, 2020.

(51) Int. Cl.
| | |
|---|---|
| *H04W 16/32* | (2009.01) |
| *H04W 36/36* | (2009.01) |
| *H04W 36/00* | (2009.01) |

(52) U.S. Cl.
CPC ......... *H04W 16/32* (2013.01); *H04W 36/362* (2023.05); *H04W 36/00692* (2023.05)

(58) Field of Classification Search
CPC ............... H04W 16/32; H04W 36/362; H04W 36/00692; H04W 16/26
See application file for complete search history.

(56) References Cited

U.S. PATENT DOCUMENTS

| | | | |
|---|---|---|---|
| 2016/0007255 A1* | 1/2016 | Sharma | H04W 36/08 |
| | | | 370/331 |
| 2016/0227459 A1* | 8/2016 | Fujishiro | H04W 36/06 |

(Continued)

FOREIGN PATENT DOCUMENTS

| | | |
|---|---|---|
| CN | 110198545 A | 9/2019 |
| CN | 110521274 A | 11/2019 |

(Continued)

OTHER PUBLICATIONS

Futurewei, "Procedure and configurations for conditional SN change", 3GPP TSG-RAN WG2 Meeting #107bis, R2-1912816, Chonqing, CN, Oct. 4, 2019 (5 pages). (Year: 2019).*

(Continued)

*Primary Examiner* — Ayaz R Sheikh
(74) *Attorney, Agent, or Firm* — Foley & Lardner LLP

(57) ABSTRACT

A master node (MN) may send a secondary node (SN) addition request message to a target SN with an indication of a maximum number of candidate PSCells that can be configured by the target SN. The MN may receive an SN addition request acknowledge message with at least one candidate PSCell configuration from the target SN in response to the SN addition request message. The MN may send, if data forwarding is needed, a data forwarding message with an indication that the data forwarding is for a CPAC based procedure to a source SN. The MN may send a RRC message to a wireless communication device including the at least one candidate PSCell configuration and one or more associated CPAC execution conditions.

20 Claims, 17 Drawing Sheets

(56) References Cited

U.S. PATENT DOCUMENTS

| | | | | |
|---|---|---|---|---|
| 2017/0223763 | A1 | 8/2017 | Rahman et al. | |
| 2020/0137719 | A1* | 4/2020 | Kim | H04W 72/12 |
| 2020/0267789 | A1* | 8/2020 | Tsai | H04W 74/0833 |
| 2023/0060537 | A1 | 3/2023 | Silva et al. | |
| 2023/0300691 | A1 | 9/2023 | Eklof et al. | |

FOREIGN PATENT DOCUMENTS

| | | | |
|---|---|---|---|
| CN | 110741725 | A | 1/2020 |
| CN | 111132338 | A | 5/2020 |
| CN | 111316695 | A | 6/2020 |
| WO | WO-2017/160351 | A1 | 9/2017 |
| WO | WO-2018/083239 | A1 | 5/2018 |
| WO | WO-2018/085049 | A1 | 5/2018 |
| WO | WO-2020/144917 | A1 | 7/2020 |
| WO | WO-2020/145736 | A1 | 7/2020 |

OTHER PUBLICATIONS

CATT (Rapporteur), "Report on Offline Discussion [108] agreeable proposals on Conditional PSCell Addition/Change (CATT)", 3GPP TSG-RAN WG2 Meeting #108, R2-1916321, Reno, USA, Nov. 23, 2019 (13 pages).

CATT, "Draft stage-2 CR for Conditional PSCell Addition/Change", 3GPP TSG-RAN2 Meeting #108, R2-1915985, Reno, USA, Nov. 8, 2019 (30 pages).

Extended European Search Report on EP Appl No. 20946840.4, dated Jul. 5, 2023 (15 pages).

Futurewei, "Procedure and configurations for conditional SN change", 3GPP TSG-RAN WG2 Meeting #107bis, R2-1912816, Chonqing, CN, Oct. 4, 2019 (5 pages).

First Taiwanese Office Action on TW Appl No. 110112438, dated Jul. 28, 2023 (14 pages).

Decision of Rejection for JP Appl. No. 2023-506225, dated May 14, 2024 (with English translation, 12 pages).

First Chinese Office Action on CN Appl No. 2020801044886, dated Sep. 13, 2023 (8 pages including English translation).

NTT DOCOMO, Inc et al., "Possible discussion points on Conditional PScell addition/change", 3GPP TSG-RAN WG3 #105bis, R3-195684, Oct. 18, 2019, Chongquing, China (9 pages).

Office Action for JP Appl. No. 2023-506225, dated Jan. 5, 2024 (with English translation, 13 pages).

CATT: "Draft Stage-2 CR for Conditional PSCell Addition/Change" 3GPP TSG-RAN2 Meeting #108; R2-1915985; Nov. 22, 2019; Reno, USA (30 pages).

International Search Report and Written Opinion for PCT Appl. No. PCT/CN2020/106073, dated Apr. 25, 2021 (12 pages).

International Search Report and Written Opinion for PCT Appl. No. PCT/CN2020/106098 mailed Apr. 1, 2021 (9 pages).

LG Electronics: "Discussion on multiple transport blocks scheduling in NB-Iot" 3GPP TSG RAN WG1 Meeting #94bis; R1-1810242; Oct. 12, 2018; Chengdu, China (5 pages).

Sony: "Transmission in preconfigured UL resources" 3GPP TSG RAN WG1 Meeting #94; R1-1808348; Aug. 24, 2018; Gothenburg, Sweden (4 Pages).

CATT, "TP for TS37.340 BLCR Conditional SN Addition & Change Procedure", 3GPP TSG RAN WG3#106, R3-196727, Reno, NV, USA, Nov. 18-22, 2019 (28 pages).

First Taiwanese Office Action TW Appl No. 110113291, dated Aug. 17, 2023 (11 pages).

ZTE, et al., "(TP for E-UTRA_Mob_enh BL CR for TS 36.423) Introduction of Maximum Number of Candidate PScells Allowed by MN", 3GPP TSG-RAN3 Meeting #107bis-e, R3-201891, Apr. 20-30, 2020, E-Meeting (25 pages).

Office Action for ID Appl. No. P00202300884, dated Dec. 31, 2025 (with English translation, 6 pages).

First Office Action for CN Appl. No. 202080102987.1, dated May 19, 2025 (with English translation, 16 pages).

Non-Final Office Action on U.S. Appl. No. 18/102,482 DTD Apr. 9, 2025.

Notice of Reasons for Rejection for JP Appl. No. 2024-136953, dated Jun. 10, 2025 (with English translation, 13 pages).

Notice of Allowance on U.S. Appl. No. 18/102,482 dated Jul. 25, 2025 (8, pages).

* cited by examiner

300

1300

1400

1500

METHOD FOR ADDITION AND CHANGE OF CONDITIONAL PRIMARY CELLS IN A SECONDARY CELL GROUP

CROSS-REFERENCE TO RELATED APPLICATION

This application claims the benefit of priority under 35 U.S.C. § 120 as a continuation of PCT Patent Application No. PCT/CN2020/106098, filed on Jul. 31, 2020, the disclosure of which is incorporated herein by reference in its entirety.

TECHNICAL FIELD

The disclosure relates generally to wireless communications, including but not limited to systems and methods for adding and changing conditional primary cells in a secondary cell group (PSCells).

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A master node (MN) may send a secondary node (SN) addition request message to a target SN with an indication of a maximum number of candidate primary cells in a secondary cell group (PSCells) that can be configured by the target SN. The MN may receive an SN addition request acknowledge message with at least one candidate PSCell configuration from the target SN in response to the SN addition request message. The MN may send, if data forwarding is needed, a data forwarding message with an indication that the data forwarding is for a conditional PSCell addition or change (CPAC) based procedure to a source SN. The MN may send a radio resource control (RRC) message to a wireless communication device including the at least one candidate PSCell configuration and one or more associated CPAC execution conditions, to cause the wireless communication device to perform a CPAC procedure to the target SN when a candidate PSCell satisfies at least one of the one or more CPAC execution conditions.

In some embodiments, the indication of a maximum number of candidate PSCells may be included in an information element of the SN addition request message. In some embodiments, the indication that the data forwarding is for a CPAC procedure may be included in an information element of the data forwarding message. In some embodiments, the wireless communication device may select a candidate PSCell residing in a candidate SN other than the source SN, or a candidate PSCell residing in the source SN when a single radio bearer three (SRB3) is not configured, to perform a CPAC procedure to the selected candidate PSCell.

In some embodiments, the MN may receive a RRC message from the wireless communication device indicating execution of the CPAC procedure to the selected candidate PSCell. In some embodiments, the MN may send, responsive to the RRC message, a Xn interface or X2 interface message to one or more candidate SNs other than the target SN, to release resources reserved for the CPAC procedure. In some embodiments, the MN may receive a Xn interface or X2 interface message from the target SN indicating successful completion of the CPAC procedure that includes identification information of the selected PSCell. In some embodiments, the MN may send another Xn interface or X2 interface message to one or more candidate SNs other than the target SN, to release resources reserved for the CPAC procedure.

In some embodiments, the MN may send an SN release message to the source SN when the selected PSCell is not a candidate PSCell residing in the source SN, to indicate release of resources of the source SN and cause the source SN to stop providing user data to the wireless communication device. In some embodiments, the MN may determine whether to modify or cancel CPAC configuration for one or more candidate PSCells according to measurement results related to the target SN. In some embodiments, the MN may send a message to the target SN indicating to modify or cancel the CPAC configuration for the one or more candidate PSCells, which includes identification information about the one or more candidate PSCells to be modified or canceled.

In some embodiments, the MN may send measurement results to the target SN related to the target SN, wherein the target SN determines whether to modify or cancel a CPAC configuration for one or more candidate PSCells according to measurement results related to the target SN. In some embodiments, the target SN may send a message to the MN indicating to modify or cancel the CPAC configuration for the one or more candidate PSCells, which includes identification information about the one or more candidate PSCells to be modified or canceled. In some embodiments, the MN may send a Xn interface or X2 interface message to the target SN to request to release the CPAC configuration for the configured candidate PSCell. In some embodiments, the Xn interface or X2 interface message may include at least one of: identification information about the configured candidate PSCell, or an indication that the release is related to replacing the CPAC configuration with a new CPAC configuration.

In some embodiments, the MN may receive a Xn interface or X2 interface message from the target SN to request to release a CPAC configuration for a configured candidate PSCell. In some embodiments, the Xn interface or X2 interface message may include at least one of: identification information about the configured candidate PSCell, or an indication that the release is related to replacing the CPAC configuration with a new CPAC configuration. In some embodiments, the MN may send a Xn interface or X2 interface message to the target SN to request addition of the new CPAC configuration. In some embodiments, the Xn interface or X2 interface message may include at least one of: identification information of a PSCell to be modified, an updated source secondary cell group (SCG) configuration, the measurement results related to the target SN, or an indication that the addition is related to replacing the CPAC configuration with the new CPAC configuration.

In some embodiments, the indication that the release is related to replacing the CPAC configuration with a new CPAC configuration may be included in an information element or a cause value of the Xn interface or X2 interface request. In some embodiments, the indication that the addition is related to replacing the CPAC configuration with the new CPAC configuration may be included in an information element or a cause value of the Xn interface or X2 interface message. In some embodiments, the MN may send to the source SN, via a Xn interface or X2 interface message, an indication of a maximum number of cells allowed to be configured as candidate cells for the CPAC procedure. In some embodiments, the indication of a maximum number of cells may be included in a RRC message included in the Xn interface or X2 interface message.

In some embodiments, the MN may receive from a source SN, via a Xn interface or X2 interface message, a request for a reference number of cells allowed to be configured as candidate cells for the CPAC procedure. In some embodiments, the reference number of cells may be included in a RRC message included in the Xn interface or X2 interface message. In some embodiments, the MN may determine whether to accept or reject the reference number of cells in the request.

At least one aspect is directed to a system, method, apparatus, or a computer-readable medium. A target secondary node (SN) may receive a SN addition request message from a master node with an indication of a maximum number of candidate primary cells in a secondary cell group (PSCells) that can be configured by the target SN. The target SN may send an SN addition request acknowledge message with at least one candidate PSCell configuration to the MN in response to the SN addition request message. The MN may send, if data forwarding is needed, a data forwarding message with an indication that the data forwarding is for a conditional PSCell addition or change (CPAC) based procedure to a source SN. The MN may send a radio resource control (RRC) message to a wireless communication device including the at least one candidate PSCell configuration and one or more associated CPAC execution conditions, to cause the wireless communication device to perform a CPAC procedure to the target SN when a candidate PSCell satisfies at least one of the one or more CPAC execution conditions.

In some embodiments, the indication of a maximum number of candidate PSCells may be included in an information element of the SN addition request message. In some embodiments, the indication that the data forwarding is for a CPAC procedure may be included in an information element of the data forwarding message. In some embodiments, the wireless communication device may select a candidate PSCell residing in a candidate SN other than the source SN, or a candidate PSCell residing in the source SN when a single radio bearer three (SRB3) is not configured, to perform a CPAC procedure to the selected candidate PSCell.

In some embodiments, the MN may receive a RRC message from the wireless communication device indicating execution of the CPAC procedure to the selected candidate PSCell. In some embodiments, the MN may send, responsive to the RRC message, a Xn interface or X2 interface message to one or more candidate SNs other than the target SN, to release resources reserved for the CPAC procedure. In some embodiments, the target SN may send a Xn interface or X2 interface message to the MN indicating successful completion of the CPAC procedure that includes identification information of the selected PSCell. In some embodiments, the MN may send another Xn interface or X2 interface message to one or more candidate SNs other than the target SN, to release resources reserved for the CPAC procedure.

In some embodiments, the MN may send an SN release message to the source SN when the selected PSCell is not a candidate PSCell residing in the source SN, to indicate release of resources of the source SN and cause the source SN to stop providing user data to the wireless communication device. In some embodiments, the MN may determine whether to modify or cancel CPAC configuration for one or more candidate PSCells according to measurement results related to the target SN. In some embodiments, the target SN may receive a message from the MN indicating to modify or cancel the CPAC configuration for the one or more candidate PSCells, which includes identification information about the one or more candidate PSCells to be modified or canceled.

In some embodiments, the target SN may receive measurement results from the MN related to the target SN, wherein the target SN determines whether to modify or cancel a CPAC configuration for one or more candidate PSCells according to measurement results related to the target SN. In some embodiments, the target SN may send a message to the MN indicating to modify or cancel the CPAC configuration for the one or more candidate PSCells, which includes identification information about the one or more candidate PSCells to be modified or canceled. In some embodiments, the target SN may receive a Xn interface or X2 interface message from the MN to request to release the CPAC configuration for the configured candidate PSCell. In some embodiments, the Xn interface or X2 interface message may include at least one of: identification information about the configured candidate PSCell, or an indication that the release is related to replacing the CPAC configuration with a new CPAC configuration.

In some embodiments, the target SN may send a Xn interface or X2 interface message to the MN to request to release a CPAC configuration for a configured candidate PSCell. In some embodiments, the Xn interface or X2 interface message may include at least one of: identification information about the configured candidate PSCell, or an indication that the release is related to replacing the CPAC configuration with a new CPAC configuration. In some embodiments, the target SN may receive a Xn interface or X2 interface message from the MN to request addition of the new CPAC configuration. In some embodiments, the Xn interface or X2 interface message may include at least one of: identification information of a PSCell to be modified, an updated source secondary cell group (SCG) configuration, the measurement results related to the target SN, or an indication that the addition is related to replacing the CPAC configuration with the new CPAC configuration.

In some embodiments, the indication that the release is related to replacing the CPAC configuration with a new CPAC configuration may be included in an information element or a cause value of the Xn interface or X2 interface request. In some embodiments, the indication that the addition is related to replacing the CPAC configuration with the new CPAC configuration may be included in an information element or a cause value of the Xn interface or X2 interface message. In some embodiments, the MN may send to the source SN, via a Xn interface or X2 interface message, an indication of a maximum number of cells allowed to be configured as candidate cells for the CPAC procedure. In some embodiments, the indication of a maximum number of cells may be included in a RRC message included in the Xn interface or X2 interface message.

In some embodiments, the MN may receive from the source SN, via a Xn interface or X2 interface message, a request for a reference number of cells allowed to be configured as candidate cells for the CPAC procedure. In some embodiments, the reference number of cells may be included in a RRC message included in the Xn interface or X2 interface message. In some embodiments, the MN may determine whether to accept or reject the reference number of cells in the request.

At least one aspect is directed to a system, method, apparatus, or a computer-readable medium. A master node (MN) may receive a SN change required message from a source secondary node (SN). The MN may send an indication of a maximum number of candidate primary cells in a secondary cell group (PSCells) that can be configured by a target SN to the target SN in an SN addition request message. The MN may receive at least one candidate PSCell configuration from the target SN in an SN addition request acknowledge message, in response to the SN addition request message. The MN may send an indication that a change from the source SN to the target SN is associated with a conditional PSCell addition or change (CPAC) based procedure to the source SN, in a Xn interface or X2 interface message. The MN may send a radio resource control (RRC) message to a wireless communication device, the RRC message including the at least one candidate PSCell configuration and one or more associated CPAC execution conditions, to cause the wireless communication device to perform a CPAC procedure to the target SN when a candidate PSCell satisfies at least one of the one or more CPAC execution conditions.

In some embodiments, the SN change required message may include an indication of the maximum number of candidate PSCells that can be configured by a target SN. In some embodiments, the indication of a maximum number of candidate PSCells may be included in an information element of the message. In some embodiments, the indication that the change is associated with the CPAC based procedure may be included in an information element of the Xn interface or X2 interface message. In some embodiments, the Xn interface or X2 interface message may include identification information of one or more PSCells that have been configured by the target SN.

In some embodiments, the Xn interface or X2 interface message may be an address indication message, to provide data forwarding information to the source SN. In some embodiments, the Xn interface or X2 interface message may be a SN change confirm message, to confirm release of resources of the source SN. In some embodiments, the SN change confirm message may indicate to the source SN to continue to provide user data to an associated wireless communication device. In some embodiments, the wireless communication device may select a candidate PSCell residing in a candidate SN other than the source SN, or a candidate PSCell residing in the source SN when a single radio bearer three (SRB3) is not configured, to perform a CPAC procedure to the selected candidate PSCell.

In some embodiments, the MN may receive a RRC message from the wireless communication device indicating execution of the CPAC procedure to the selected candidate PSCell. In some embodiments, the MN may send a Xn interface or X2 interface message, responsive to the RRC message, to one or more candidate SNs other than the target SN, to release resources reserved for the CPAC procedure. In some embodiments, the MN may receive a Xn interface or X2 interface message from the target SN indicating successful completion of the CPAC procedure that includes identification information of the selected candidate PSCell. In some embodiments, the MN may send another Xn interface or X2 interface message to one or more candidate SNs other than the target SN to release resources reserved for the CPAC procedure.

In some embodiments, the MN may send another Xn interface or X2 interface message to the source SN when the selected candidate PSCell is not a candidate PSCell residing in the source SN to indicate release of resources of the source SN. In some embodiments, the MN may cause the source SN to stop providing user data to the wireless communication device. In some embodiments, the another Xn interface or X2 interface message may be a SN release message or a SN change confirm message. In some embodiments, the source SN may determine whether to modify or cancel a CPAC configuration for one or more candidate PSCells according to measurement results related to the target SN. In some embodiments, the source SN may inform the target SN about the identification information of the one or more candidate PSCells to be modified or canceled.

In some embodiments, the source SN may send measurement results related to the target SN to the target SN. In some embodiments, the target SN may determine whether to modify or cancel CPAC configuration for one or more candidate PSCells according to the measurement results. In some embodiments, the MN may receive a Xn interface or X2 interface message from the source SN to request to release a CPAC configuration for a configured candidate PSCell, the Xn interface or X2 interface message including at least one of: identification information of the one or more candidate PSCells to be released or modified, or an indication that the release is related to replacing the CPAC configuration with a new CPAC configuration. In some embodiments, the MN may send another Xn interface or X2 interface message to the target SN to request to release the CPAC configuration for the configured candidate PSCell, the another Xn interface or X2 interface message including at least one of: the identification information of the one or more candidate PSCells to be released or modified, or the indication that the release is related to replacing the CPAC configuration with the new CPAC configuration.

In some embodiments, the MN may receive a Xn interface or X2 interface message from the target SN to request to release a CPAC configuration for a configured candidate PSCell, the Xn interface or X2 interface message including at least one of: identification information of the one or more candidate PSCells to be released or modified, or an indication that the release is related to replacing the CPAC configuration with a new CPAC configuration. In some embodiments, the MN may send a Xn interface or X2 interface message to the target SN to request addition of the new CPAC configuration, the Xn interface or X2 interface message including at least one of: identification information of the one or more candidate PSCells to be added or modified, an updated source secondary cell group (SCG)

configuration, the measurement results related to the target SN, or an indication that the addition is related to replacing the CPAC configuration with the new CPAC configuration.

In some embodiments, the indication that the release is related to replacing the CPAC configuration with the new CPAC configuration may be included in an information element or a cause value of the Xn interface or X2 interface request. In some embodiments, the indication that the addition is related to replacing the CPAC configuration with the new CPAC configuration may be included in an information element or a cause value of the Xn interface or X2 interface message.

In some embodiments, the MN may send an indication of a maximum number of cells allowed to be configured as candidate cells for the CPAC procedure to the source SN via another Xn interface or X2 interface message. In some embodiments, the indication of a maximum number of cells may be included in a RRC message included in the another Xn interface or X2 interface message. In some embodiments, the MN may receive a request for a reference number of cells allowed to be configured as candidate cells for the CPAC procedure from the source SN. In some embodiments, the reference number of cells may be included in a RRC message included in another Xn interface or X2 interface message. In some embodiments, the MN may determine whether to accept or reject the reference number of cells in the request.

At least one aspect is directed to a system, method, apparatus, or a computer-readable medium. A source secondary node (SN) may send a SN change required message to a master node (MN). The MN may send an indication of a maximum number of candidate primary cells in a secondary cell group (PSCells) that can be configured by a target SN to the target SN in an SN addition request message. The MN may receive at least one candidate PSCell configuration from the target SN in an SN addition request acknowledge message, in response to the SN addition request message. The SN may receive an indication that a change from the source SN to the target SN is associated with a conditional PSCell addition or change (CPAC) based procedure from the MN, in a Xn interface or X2 interface message. The MN may send a radio resource control (RRC) message to a wireless communication device, the RRC message including the at least one candidate PSCell configuration and one or more associated CPAC execution conditions, to cause the wireless communication device to perform a CPAC procedure to the target SN when a candidate PSCell satisfies at least one of the one or more CPAC execution conditions.

In some embodiments, the SN change required message may include an indication of the maximum number of candidate PSCells that can be configured by a target SN. In some embodiments, the indication of a maximum number of candidate PSCells may be included in an information element of the message. In some embodiments, the indication that the change is associated with the CPAC based procedure may be included in an information element of the Xn interface or X2 interface message. In some embodiments, the Xn interface or X2 interface message may include identification information of one or more PSCells that have been configured by the target SN.

In some embodiments, the Xn interface or X2 interface message may be an address indication message, to provide data forwarding information to the source SN. In some embodiments, the Xn interface or X2 interface message may be a SN change confirm message, to confirm release of resources of the source SN. In some embodiments, the SN change confirm message may indicate to the source SN to continue to provide user data to an associated wireless communication device. In some embodiments, the wireless communication device may select a candidate PSCell residing in a candidate SN other than the source SN, or a candidate PSCell residing in the source SN when a single radio bearer three (SRB3) is not configured, to perform a CPAC procedure to the selected candidate PSCell.

In some embodiments, the MN may receive a RRC message from the wireless communication device indicating execution of the CPAC procedure to the selected candidate PSCell. In some embodiments, the MN may send a Xn interface or X2 interface message, responsive to the RRC message, to one or more candidate SNs other than the target SN, to release resources reserved for the CPAC procedure. In some embodiments, the MN may receive a Xn interface or X2 interface message from the target SN indicating successful completion of the CPAC procedure that includes identification information of the selected candidate PSCell. In some embodiments, the MN may send another Xn interface or X2 interface message to one or more candidate SNs other than the target SN to release resources reserved for the CPAC procedure.

In some embodiments, the source SN may receive another Xn interface or X2 interface message from the MN when the selected candidate PSCell is not a candidate PSCell residing in the source SN to indicate release of resources of the source SN. In some embodiments, the Xn interface or X2 interface message may cause the source SN to stop providing user data to the wireless communication device. In some embodiments, the another Xn interface or X2 interface message may be a SN release message or a SN change confirm message. In some embodiments, the source SN may determine whether to modify or cancel a CPAC configuration for one or more candidate PSCells according to measurement results related to the target SN. In some embodiments, the source SN may inform the target SN about the identification information of the one or more candidate PSCells to be modified or canceled.

In some embodiments, the source SN may send measurement results related to the target SN to the target SN. In some embodiments, the target SN may determine whether to modify or cancel CPAC configuration for one or more candidate PSCells according to the measurement results. In some embodiments, the source SN may send a Xn interface or X2 interface message to the MN to request to release a CPAC configuration for a configured candidate PSCell, the Xn interface or X2 interface message including at least one of: identification information of the one or more candidate PSCells to be released or modified, or an indication that the release is related to replacing the CPAC configuration with a new CPAC configuration. In some embodiments, the MN may send another Xn interface or X2 interface message to the target SN to request to release the CPAC configuration for the configured candidate PSCell, the another Xn interface or X2 interface message including at least one of: the identification information of the one or more candidate PSCells to be released or modified, or the indication that the release is related to replacing the CPAC configuration with the new CPAC configuration.

In some embodiments, the MN may receive a Xn interface or X2 interface message from the target SN to request to release a CPAC configuration for a configured candidate PSCell, the Xn interface or X2 interface message including at least one of: identification information of the one or more candidate PSCells to be released or modified, or an indication that the release is related to replacing the CPAC configuration with a new CPAC configuration. In some embodiments, the MN may send a Xn interface or X2 interface message to the target SN to request addition of the new CPAC configuration, the Xn interface or X2 interface message including at least one of: identification information of the one or more candidate PSCells to be added or modified, an updated source secondary cell group (SCG) configuration, the measurement results related to the target SN, or an indication that the addition is related to replacing the CPAC configuration with the new CPAC configuration.

In some embodiments, the indication that the release is related to replacing the CPAC configuration with the new CPAC configuration may be included in an information element or a cause value of the Xn interface or X2 interface request. In some embodiments, the indication that the addition is related to replacing the CPAC configuration with the new CPAC configuration may be included in an information element or a cause value of the Xn interface or X2 interface message.

In some embodiments, the source SN may receive an indication of a maximum number of cells allowed to be configured as candidate cells for the CPAC procedure from the MN via another Xn interface or X2 interface message. In some embodiments, the indication of a maximum number of cells may be included in a RRC message included in the another Xn interface or X2 interface message. In some embodiments, the source SN may send a request for a reference number of cells allowed to be configured as candidate cells for the CPAC procedure to the MN. In some embodiments, the reference number of cells may be included in a RRC message included in another Xn interface or X2 interface message. In some embodiments, the MN may determine whether to accept or reject the reference number of cells in the request.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Figure 1:
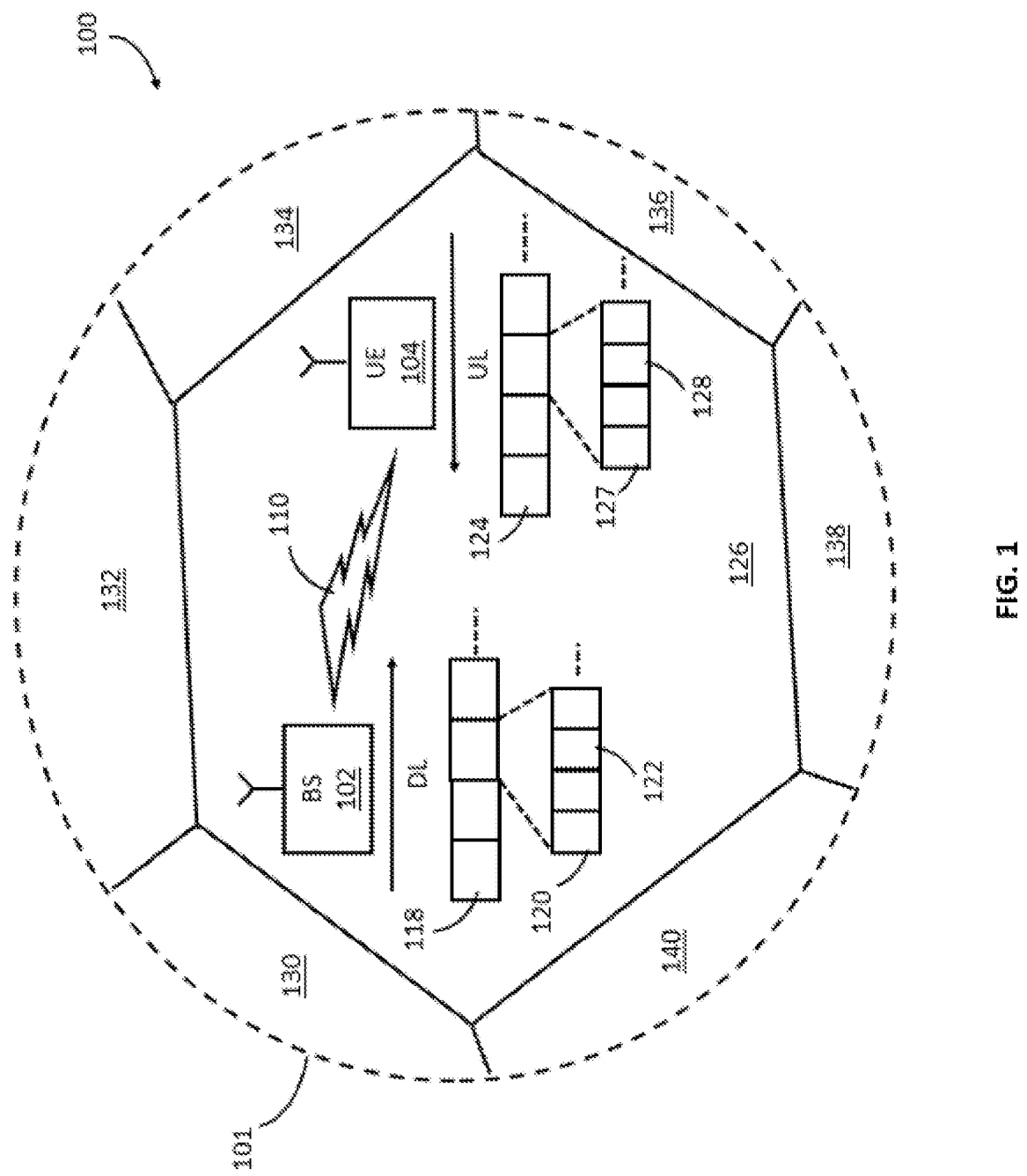
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP t | 3rd Generation Partnership Project |
| 5G | 5th Generation Mobile Networks |
| 5G-AN | 5G Access Network |
| 5G gNB | Next Generation NodeB |
| 5G-GUTI | Globally Unique Temporary UE Identify |
| AF | Application Function |
| AMF | Access and Mobility Management Function |
| AN | Access Network |
| ARP | Allocation and Retention Priority |
| CA | Carrier Aggregation |
| CHO | Conditional Handover |
| CM | Connected Mode |
| CMR | Channel Measurement Resource |
| CPAC | Conditional PSCell Addition/Change |
| CSI | Channel State Information |
| CQI | Channel Quality Indicator |
| CSI-RS | Channel State Information Reference Signal |
| CRI | CSI-RS Resource Indicator |
| CSS | Common Search Space |
| DAI | Downlink Assignment Index |
| DCI | Downlink Control Information |
| DL | Down Link or Downlink |
| DN | Data Network |
| DNN | Data Network Name |
| ETSI | European Telecommunications Standards |

-continued

| Acronym | Full Name |
| --- | --- |
| | Institute |
| FR | Frequency range |
| GBR | Guaranteed Bit Rate |
| GFBR | Guaranteed Flow Bit Rate |
| HARQ | Hybrid Automatic Repeat Request |
| MAC-CE | Medium Access Control (MAC) Control Element (CE) |
| MCS | Modulation and Coding Scheme |
| MBR | Maximum Bit Rate |
| MFBR | Maximum Flow Bit Rate |
| NAS | Non-Access Stratum |
| NF | Network Function |
| NG-RAN | Next Generation Node Radio Access Node |
| NR | Next Generation RAN |
| NZP | Non-Zero Power |
| OFDM | Orthogonal Frequency-Division Multiplexing |
| OFDMA | Orthogonal Frequency-Division Multiple Access |
| PCF | Policy Control Function |
| PDCCH | Physical Downlink Control Channel |
| PDSCH | Physical Downlink Shared Channel |
| PDU | Packet Data Unit |
| PUCCH | Physical uplink control channel |
| PMI | Precoding Matrix Indicator |
| PPCH | Physical Broadcast Channel |
| PRI | PUCCH resource indicator |
| QoS | Quality of Service |
| RAN | Radio Access Network |
| RAN CP | Radio Access Network Control Plane |
| RAT | Radio Access Technology |
| RBG | Resource Block Group |
| RRC | Radio Resource Control |
| RV | Redundant Version |
| SM NAS | Session Management Non Access Stratum |
| SMF | Session Management Function |
| SRS | Sounding Reference Signal |
| SS | Synchronization Signal |
| SSB | SS/PBCH Block |
| TB | Transport Block |
| TC | Transmission Configuration |
| TCI | Transmission Configuration Indicator |
| TRP | Transmission/Reception Point |
| UCI | Uplink Control Information |
| UDM | Unified Data Management |
| UDR | Unified Data Repository |
| UE | User Equipment |
| UL | Up Link or Uplink |
| UPF | User Plane Function |
| USS | UE Specific Search Space |

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
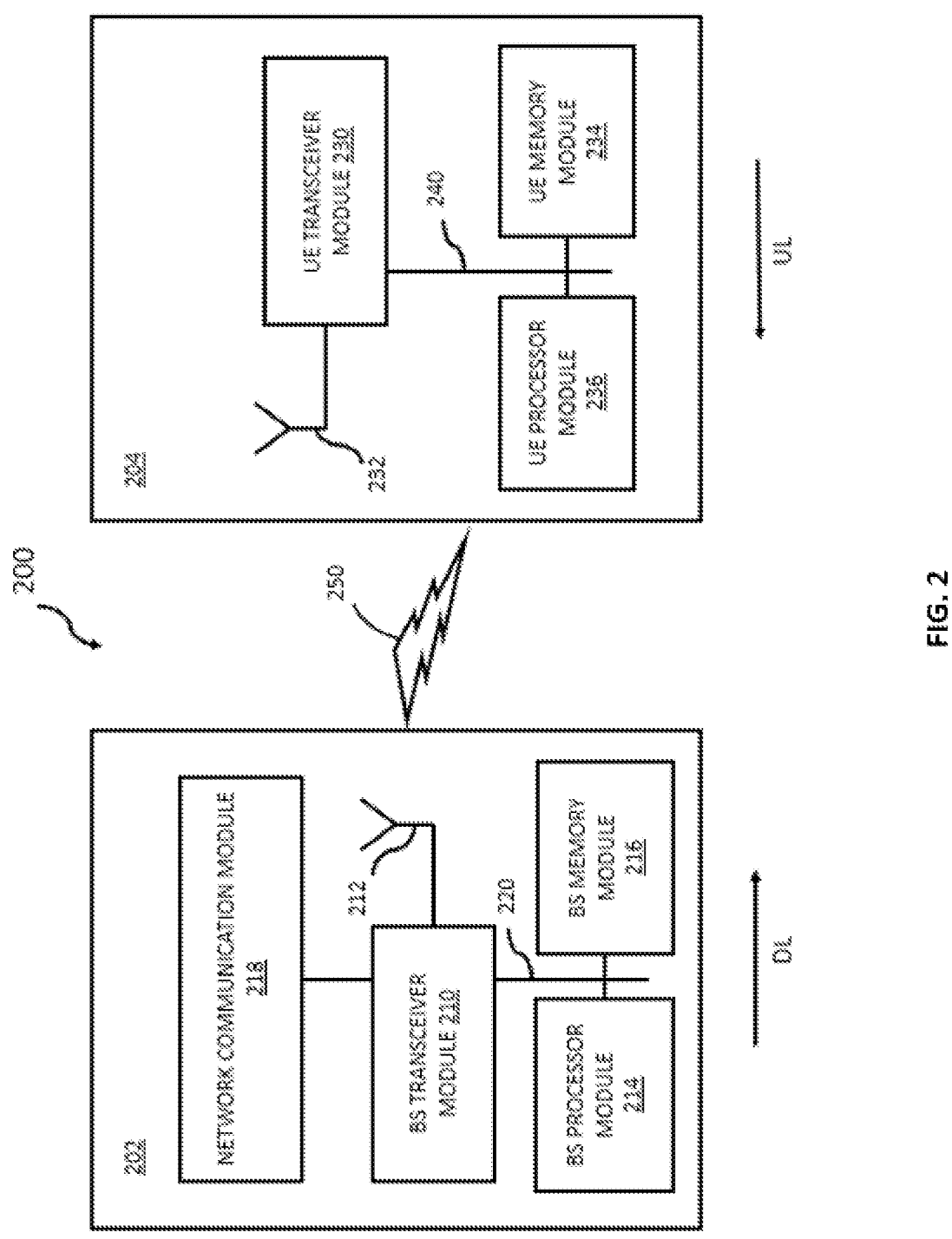
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Improving Mobility Reliability in PSCell Addition or Change Mobility performance may be one of the most important performance metrics for long term evolution (LTE) and 5th Generation (5G) new radio (NR). In addition to traditional voice and internet data services, a plurality of innovative services with one or more quality of service (QoS) requirements have emerged in recent years. For example, ultra-reliability and/or low latency may be essential to the implementation/performance of modern services (e.g., remote control, aerial, industrial automation, industrial control, augmented reality (AR), virtual reality (VR) services and/or other services). The mobility performance of said services may be guaranteed with very high reliability (robust) and very low interruption time. For example, during handover, a latency target of the interruption time may be as small as possible (e.g., close to 0 ms or 0 ms). Thus, a mechanism may be needed to improve the mobility performance and/or achieve the requirements of minimal interruption and/or high reliability. The systems and methods presented herein include a novel approach for mobility control to improve/increase mobility performance by at least 25% (e.g., 35, 45 or other percent) for example. The improvement/increase in mobility performance may result in at least a 25% (e.g., 35, 45 or other percent) improvement in mobility reliability for primary cells in a secondary cell group (PSCells) addition or change, for example.

A wireless communication device (e.g., a UE, a terminal, or a served node) in a wireless communication network may operate in dual connectivity (DC), including intra-E-UTRA DC or multi-radio DC (MR-DC). In the case of intra-E-UTRA DC, the MN (master node, such as BS 102 in FIG. 1) and the SN (secondary node, such as BS 102 in FIG. 1) may provide/supply E-UTRA access. In the case of MR-DC, a first node may provide/supply NR access and a second node may provide/supply E-UTRA or NR access. One or more serving cells may be configured on the MN and/or the SN. The serving cells configured on the MN may be defined/specified as a master cell group (MCG). The serving cells configured on the SN may be defined/specified as a secondary cell group (SCG). Each cell group includes at least one primary cell and one or more secondary cells. The primary cell in the MCG may be referred to as PCell. The primary cell in the SCG may be referred to as PSCell. When operating in DC, a radio bearer (RB) may be configured to utilize the MCG resources and/or SCG resources (e.g., MCG bearer, SCG bearer, and/or split bearer).

Figure 3:
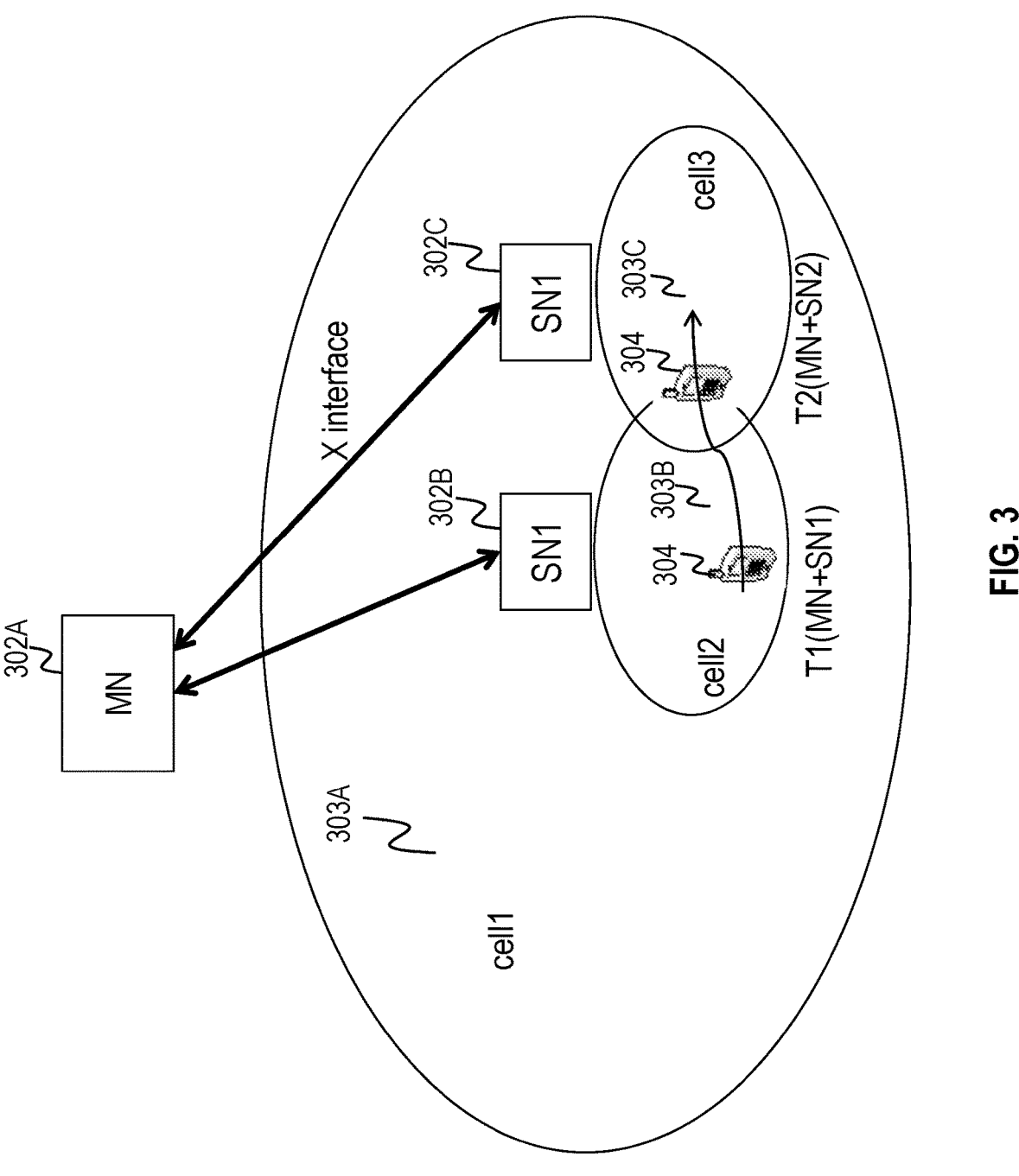
FIG. 3 illustrates a block diagram of an example wireless communication environment for a secondary node change, in accordance with some embodiments of the present disclosure.

Referring now to FIG. 3, depicted is a representation 300 of an example wireless communication environment for a secondary node (SN) change, in accordance with some embodiments of the present disclosure. The example environment 300 may include a wireless communication device 304, a master node (MN) 302A (shown in FIG. 3 as "MN"), a "first" secondary wireless communication node 302B (shown in FIG. 3 as "SN1"), and a "second" secondary wireless communication node 302C (shown in FIG. 3 as "SN2"). In some embodiments, the MN 302A, the SN 302B, and/or the SN 302C may correspond to a ground terminal, a base station, a gNB, an eNB, or a serving node.

Cell 303A (shown in FIG. 3 as, "cell1"), cell 303B (shown in FIG. 3 as, "cell2"), and cell 303C (shown in FIG. 3 as, "cell3") are the corresponding cells generated by the MN 302A, the SN 302B and the SN 302C respectively. The SCG may include/comprise cell 303B and/or cell 303C, each referred to as a primary SCG cell (PSCell). One or more X interfaces may be deployed/established between the MN 302A and the SN 302B, and the SN 302C respectively. At time T1, the wireless communication device 304 may operate in dual connectivity (DC) between the MN 302A and the SN 302B. With the movement of the wireless communication device 304, at time T2, the SN may change/switch/adjust from the SN 302B to the SN 302C. The SN change may be initiated/configured either by the MN 302A or the source SN.

A conditional PSCell addition or change (CPAC) may be promoted to improve/increase/enhance mobility reliability (i.e., mobility robust) in the case of a SN change or SN addition. The CPAC may comprise a PSCell addition or change executed/configured by the wireless communication device. The wireless communication device may execute the PSCell addition or change if one or more associated CPAC execution conditions are met/satisfied. The wireless communication device may evaluate/assess/appraise the CPAC execution conditions responsive to receiving/obtaining the CPAC configuration. The wireless communication device may suspend the evaluation of the CPAC execution conditions once the PSCell addition or change is initiated. The CPAC configuration may include the candidate PSCell configuration generated by the candidate SN and/or the corresponding execution condition(s) for the candidate PSCell.

A. Candidate Cell Coordination Between the MN and the SN a. The Coordination of the Candidate Number of PSCells in the Case of a CPAC Procedure In a CPAC, a limited number of candidate PSCells may be configured (e.g., up to 8 or other number of candidate PSCells). The MN and/or the SN may initiate/trigger the CPAC. In some embodiments, the candidate number of PSCells configured by the MN and/or the SN may be coordinated. The embodiments discussed herein are non-limiting examples that describe alternatives and options for coordinating the candidate number of PSCells. The alternatives and options presented herein may be independent procedures that apply to one or more embodiments.

Alternative 1: The MN may manage/configure one or more candidate PSCells. In some embodiments, the MN may generate the final radio resource control (RRC) message (or other messages) including the CPAC configuration to the wireless communication device regardless of whether the MN is involved with the CPAC.

The MN may send/transmit/broadcast an indication (or other information) to the SN. The indication (or other information) may inform/specify to the SN that the MN generates the final RRC message in one or more CPAC cases. Therefore, the SN may transfer/send/transmit one or more execution conditions and/or CPAC containers including candidate PSCell configuration to the MN. If the CPAC configuration excludes the MN (e.g., intra-SN conditional PSCell change without MN involvement), the MN may still receive/obtain the execution condition(s) and/or CPAC containers from the SN. The MN may transfer/send/transmit the indication (or other information) using at least one of the following options. The operations and functionalities described in these options may be performed by any one or more of the components and/or operations described in connection with FIGS. 10-15.

Option 1: A Xn and/or X2 interface message may include/specify/provide the indication (e.g., MN controlled CPAC). For example, an SN (SgNB) addition request message, SN (SgNB) modification request message, and/or other messages may include the indication as one or more information elements.

Option 2: A RRC message may include/specify/provide the indication (e.g., MN controlled CPAC). For example, a CG-ConfigInfo message (or other message) may include the indication. A SN (SgNB) addition request message, SN (SgNB) modification request message, and/or other messages may include the RRC message as one or more information elements.

Alternative 2: The MN and the SN may use/generate/implement an inter-node renegotiation solution to allocate/determine/configure the number of candidate PSCells configured/initiated by the SN.

The MN may indicate/specify/provide the maximum number of cells allowed to be configured as candidate cells for the CPAC procedure to the SN. The MN may send/transfer an indication specifying the maximum number of PSCells using at least one of the following options. The operations and functionalities described in these options may be performed by any one or more of the components and/or operations described in connection with FIGS. 10-15.

Option 1: A Xn and/or X2 interface message may include/specify/provide the indication (e.g., maximum number of cells). For example, an SN (SgNB) addition request message, SN (SgNB) modification request message, and/or other messages may include the indication as one or more information elements Option 2: A RRC message may include/specify/provide the indication (e.g., maximum number of cells). For example, a CG-ConfigInfo message (or other message) may include the indication. A SN (SgNB) addition request message, SN (SgNB) modification request message, and/or other messages may include the RRC message as one or more information elements.

In some embodiments, the SN may request one or more additional candidate cells from the MN. Therefore, the SN may request a reference number of cells allowed to be configured as candidate cells for the CPAC procedure from the MN. The SN may send/transfer an indication for the reference number of PSCells using at least one of the following options. The operations and functionalities described in these options may be performed by any one or more of the components and/or operations described in connection with FIGS. 10-15.

Option 1: A Xn and/or X2 interface message may include the indication (e.g., requested number of cells). For example, an SN (SgNB) addition request acknowledge message, SN (SgNB) modification request acknowledge message, SN (SgNB) modification required message, and/or other messages may include the indication as one or more information elements.

Option 2: A RRC message may include the indication (e.g., requested number of cells). For example, a CG-Config message (or other message) may include the indication. A SN (SgNB) addition request acknowledge message, SN (SgNB) modification request acknowledge message, SN (SgNB) modification required message, and/or other messages may include the RRC message as one or more information elements.

In some embodiments, the MN may accept/approve the reference number of cells in the request from the SN. If the MN denies/rejects the reference number of cells, the MN may reject/dismiss the received Xn or X2 interface message.

The candidate number of cells for the SN may be considered using at least one of the following options:

Option 1: The candidate cell for the CPAC procedure initiated by the SN.

Option 2: The candidate cell for the CPAC procedure whose final CPAC command may be generated by the SN. This option may apply to intra-SN conditional PSCell change (CPC) without MN involvement.

Alternative 3: The MN may directly indicate/specify/provide the candidate number of PSCells allowed to be configured/initiated to the SN.

The MN may indicate/specify/provide the maximum number of cells allowed to be configured as candidate cells for the CPAC procedure to the SN. The MN may send/transfer an indication specifying the maximum number of PSCells using at least one of the following options:

Option 1: A Xn and/or X2 interface message may include the indication (e.g., maximum number of cells). For example, an SN (SgNB) addition request message, SN (SgNB) modification request message, and/or other messages may include the indication as one or more information elements.

Option 2: A RRC message may include the indication (e.g., maximum number of cells). For example, a CG-ConfigInfo message (or other message) may include the indication. A SN (SgNB) addition request message, SN (SgNB) modification request message, and/or other messages may include the RRC message as one or more information elements.

b. The Coordination of the Candidate Number of Cells in the Coexistence of Conditional Handover (CHO) and CPAC In some embodiments, the maximum number of candidate cells for a target PCell and PSCell may be limited (e.g., up to 8 or other number of candidate cells). Therefore, if CPAC and CHO procedures are configured simultaneously, the MN and the SN may coordinate/configure the number of candidate cells. The MN may configure/control/determine the candidate number of PCells for the CHO and/or the candidate number of PSCells for MN initiated CPAC. The SN may configure the candidate number of PSCells for SN initiated CPAC. Thus, one or more of the aforementioned solutions for candidate PSCell coordination may be used for candidate cell (e.g., including both PCell and PSCell) coordination if CHO and CPAC are configured simultaneously. In some embodiments, for the coexistence of CHO and CPAC, the candidate PCell and/or PSCell configurations may be encased in a same/corresponding conditional reconfiguration container. The candidate number of cells in the reconfiguration container may correspond to 2 (or other numbers).

B. Inter-Node Interaction During the CPAC Preparation Phase a. Informing the Target SN of the Maximum Number of Candidate PSCells Allowed to be Configured During inter-SN CPAC, the target SN may select/identify/specify the target PSCell. The target SN may utilize one or more measurement results related to the target SN to select the candidate PSCell. The MN and/or the source SN may provide/specify the measurement result(s) to the target SN. The MN and/or the SN may provide one or more measurement results of one or more candidate cells. Therefore, the target SN may select one or more cells to configure as candidate PSCells in one round of SN addition procedure. The source SN and/or the MN may indicate/provide/specify the maximum number of candidate PSCells configured by the target SN when requesting the CPAC to the target SN (e.g., sending/transmitting a SN (SgNB) addition request message to the target SN).

One or more procedures to indicate the maximum number of candidate PSCells to the target SN may be configured.

The embodiments discussed herein are non-limiting examples that describe the one or more procedures.

For MN initiated CPAC, the MN may decide/determine that the target SN configures/determines the maximum number of candidate PSCells. The MN may send/transmit an indication to inform the target SN of the determination. The MN may utilize at least one of the following options to send/transmit the indication to the target SN. The operations and functionalities described in these options may be performed by any one or more of the components and/or operations described in connection with FIGS. 10 and 11, such as operations 210 and 310.

Option 1: A Xn and/or X2 interface message may include the indication (e.g., maximum number of candidate PSCell). For example, an SN (SgNB) addition request message and/or other messages may include the indication as one or more information elements.

Option 2: A RRC message may include the indication (e.g., maximum number of candidate PSCell). For example, a CG-ConfigInfo message (or other message) may include the indication. A SN (SgNB) addition request message and/or other messages may include the RRC message as one or more information elements.

For SN initiated CPAC, one or more alternatives may be considered.

Alternative 1: The source SN may decide/determine that the target SN configures the maximum number of candidate PSCells. The source SN may send/transmit an indication to inform the MN of the determination. The MN may send/transmit/broadcast the indication to the target SN. The indication may be similar to the indication that corresponds to the MN initiated CPAC procedure. The source SN and/or the MN may send/transmit the indication using at least one of the following options. The operations and functionalities described in these options may be performed by any one or more of the components and/or operations described in connection with FIGS. 12, 13 and 14 such as operations 410, 510 and 610.

Option 1: A Xn and/or X2 interface message may include the indication (e.g., maximum number of candidate PSCell). For example, an SN (SgNB) change required message and/or other messages may include the indication as one or more information elements.

Option 2: A RRC message may include the indication (e.g., maximum number of candidate PSCell). For example, a CG-Config message (or other message) may include the indication. A SN (SgNB) change required message and/or other messages may include the RRC message as one or more information elements.

Alternative 2: The MN may decide/determine that the target SN configures the maximum number of candidate PSCells. The MN may send/transmit/broadcast the indication to the target SN. The indication may be similar to the indication that corresponds to the MN initiated CPAC procedure. The operations and functionalities described in this alternative may be performed by any one or more of the components and/or operations described in connection with FIGS. 12, 13 and 14, such as operation 420, 520 and 620.

b. Informing the Source SN about the CPAC Related Information

In some embodiments of the MN initiated SN change procedure, the MN may initiate/trigger the SN release procedure to release/make available the source SN resources (e.g., sending/transmitting the SN (SgNB) release request message to the source SN). The MN may initiate the SN release procedure responsive to completing/finalizing the SN addition procedure (e.g., receive/obtain the SN (SgNB) addition request acknowledge message from the target SN). The source SN may receive/obtain the SN (SgNB) release request message (or other messages). Responsive to receiving the release request message, the source SN may cease to provide user data (or other information) to the wireless communication device. For the conditional SN change, the wireless communication device may maintain the transmission and/or reception of data with the source SN until one or more execution conditions are met/satisfied. For example, the wireless communication device may continue the transmission/reception of data with the source SN upon receiving/obtaining one or more CPAC commands. Therefore, the MN may initiate/trigger the SN release procedure responsive to confirming the completion of the CPAC execution (e.g., successful completion of the random access to the target PSCell).

In some embodiments, the MN may enable early data forwarding for SN terminated bearers. In said instances, the MN may provide/indicate/specify a data forwarding address to the source SN. The MN may inform/specify that the data forwarding address relates to the CPAC procedure. The MN may provide the data forwarding address responsive to completing/finalizing the SN addition procedure.

In some embodiments, one or more procedures (e.g., MN initiated CPAC procedures) may be used/enabled/implemented to transfer/send/transmit the data forwarding information to the source SN. The data forwarding information (e.g., forwarding address, transport layer address, and/or other information) may be transmitted responsive to completing the SN addition procedure. The embodiments discussed herein are non-limiting examples that describe the one or more procedures.

Step 1: If data forwarding is enabled, the MN may send/transmit/transfer a message to provide the data forwarding information to the source SN. The message may comprise an indication to specify that the procedure is a CPAC based procedure. The MN may send/transmit the indication to the source SN using at least one of the following options. The operations and functionalities described in these options may be performed by any one or more of the components and/or operations described in connection with FIGS. 10, 13 and 14, such as operations 220, 540 and 640.

Option 1: A Xn or X2 interface message (or other messages) may include the indication. For example, a Xn-U address indication message, a data forwarding address indication message, and/or other messages may include a CPAC indicator as one or more information elements.

Option 2: A Xn or X2 interface message may include the indication as a "cause" value (or other values). For example, a Xn-U address indication message, a data forwarding address indication message, and/or other messages may include/specify a "cause" value. The "cause" value may be set/modified to indicate/specify "conditional SN mobility".

Step 2: Responsive to receiving/obtaining the message, the source SN may perform/enable early data forwarding for SN-terminated bearers. In some embodiments, the source SN may send/transmit an early status transfer message (or other messages) to the source MN and/or target SN.

In some embodiments of the SN initiated SN change procedure, the MN may confirm the release of the source SN resources by sending/transmitting the SN (SgNB) change confirm message (or other messages) to the source SN. The MN may send/transmit the message responsive to successfully allocating the target SN resources (e.g., receiving/obtaining a RRCReconfigurationComplete message from the wireless communication device). Responsive to receiving the SN (SgNB) change confirm message, the source SN may cease to provide user data (or other information) to the wireless communication device. For the conditional SN change, the wireless communication device may maintain the transmission and/or reception of data with the source SN until one or more execution conditions are met/satisfied. For example, the wireless communication device may continue the transmission/reception of data with the source SN upon receiving/obtaining one or more CPAC commands. Therefore, the MN may indicate/inform/specify to the source SN that the release of the resources is enabled by a CPAC based procedure. The SN may continue to provide user data (or other information) to the wireless communication device.

In some embodiments, one or more procedures (e.g., SN initiated CPAC procedures) may be used/enabled/implemented to inform the source SN about the CPAC based procedure in the SN change confirm. The embodiments discussed herein are non-limiting examples that describe the one or more procedures.

Step 1: In the SN change confirm, the MN may send/transmit an indication to the source SN. The indication may specify/inform that the procedure is a CPAC based procedure. The MN may send/transmit the indication to the source SN using at least one of the following options. The operations and functionalities described in these options may be performed by any one or more of the components and/or operations described in connection with FIGS. 12 and 13, such as operations 440 and 590.

Option 1: A Xn or X2 interface message (or other messages) may include the indication. For example, the SN (SgNB) change confirm message and/or other messages may include a CPAC indicator as one or more information elements.

Option 2: The SN (SgNB) change confirm message (or other messages) may include the indication as a "cause" value (or other values). For example, the "cause" value may be set/modified to indicate/specify "conditional SN mobility".

Option 3: A RRC message (or other messages) may include/specify the indication. For example, a CG-ConfigInfo message may include the indication. A SN (SgNB) change confirm message (or other messages) may include the RRC message as one or more information elements.

Step 2: Responsive to receiving/obtaining the SN (SgNB) change confirm message with the indication, the source SN may continue to provide user data (or other information) to the wireless communication device. In some embodiments, the source SN may initiate data forwarding, if applicable.

In some embodiments of an SN initiated conditional SN change procedure, the target SN may provide the identification information of the selected candidate PSCell to the MN. The target SN may provide the identification information via a SN (SgNB) addition request acknowledge message (refer to operations 430, 530 and 630 in connection with FIGS. 12, 13 and 14). The target SN may provide the identification information responsive to completing/finalizing the candidate PSCell configuration. The MN may send/transfer/transmit the PSCell identification information to the source SN for a subsequent candidate PSCell control.

One or more procedures to inform the source SN about the identification information of the selected candidate PSCells (e.g., SN initiated conditional SN change) may be configured/enabled/implemented/used. The embodiments discussed herein are non-limiting examples that describe the one or more procedures.

Alternative 1: The MN may send/transfer PSCell identification information and/or a list of PSCell identification information to the source SN. The MN may send the information via a message to provide/specify/indicate data forwarding information. The operations and functionalities described in the following options may be performed by any one or more of the components and/or operations described in connection with FIGS. 13 and 14, such as operation 540 and 640.

Option 1: A Xn or X2 interface message may include/provide/specify the PSCell identification information. For example, the Xn-U address indication message, data forwarding address indication message, and/or other messages may include the PSCell identification information as one or more information elements.

Option 2: A RRC message may include/provide/specify the PSCell identification information. For example, a CG-ConfigInfo message may include the PSCell identification information. A Xn-U address indication message, data forwarding address indication message, and/or other messages may include the RRC message as one or more information elements.

Alternative 2: The MN may send/transfer PSCell identification information and/or a list of PSCell identification information to the source SN. The MN may send the information via a message to confirm the successful allocation of target SN resources and/or the release of the source SN resources. The operations and functionalities described in the following options may be performed by any one or more of the components and/or operations described in connection with FIG. 12, such as operation 440.

Option 1: A Xn or X2 interface message may include/provide/specify the PSCell identification information. For example, the SN (SgNB) change confirm message and/or other messages may include the PSCell identification information as one or more information elements.

Option 2: A RRC message may include/provide/specify the PSCell identification information. For example, a CG-ConfigInfo message may include the PSCell identification information. The SN (SgNB) change confirm message and/or other messages may include the RRC message as one or more information elements.

The aforementioned PSCell identification information may be indicated/specified using one or more of the following options:

Option 1: The PSCell identification information may be indicated using the frequency of the PSCell (or other frequencies).

Option 2: The PSCell identification information may be indicated using the frequency and/or physical cell identity (PCI) of the PSCell.

Option 3: The PSCell identification information may be indicated using the cell global identifier (CGI) of the PSCell (or other identifiers).

In some embodiments, the source SN may add, modify, and/or release one or more execution conditions for each PSCell identification information (e.g., for each frequency, for each PCI and frequency, and/or other information). The source SN may add, modify, and/or release the execution condition(s) responsive to receiving/obtaining the candidate PSCell identification information. The source SN may send/transfer/transmit the one or more execution conditions to the MN by initiating an SN initiated SN modification procedure. The source SN may provide/specify the execution condition(s) per PSCell identification information via a message (e.g., SN (SgNB) modification required message or other messages). The source SN may provide the execution condition(s) using one or more options.

Option 1: A Xn or X2 interface message may include/provide/specify the execution condition(s). For example, the SN (SgNB) modification required message and/or other messages may include the execution condition(s) as one or more information elements.

Option 2: A RRC message may include/provide/specify the execution condition(s). For example, a CG-Config message may include the execution condition(s). The SN (SgNB) modification required message and/or other messages may include the RRC message as one or more information elements.

c. Linking the Related Execution Conditions with a Candidate PSCell

The MN and/or the SN may initiate/trigger the conditional PSCell change. The MN and/or the SN may provide/indicate the measurement results related to the target SN when requesting the CPAC to the target SN. The target SN may select/identify a candidate PSCell with related measurement results provided/specified by the MN and/or the SN (e.g., the PSCell information may be included in the candidateCellInfoListMN and candidateCellInfoListSN) simultaneously. The MN and/or the source SN may provide/specify/indicate the execution condition(s) for each cell in said case. Therefore, one or more approaches for linking/relating the execution condition(s) to the candidate PSCell may be considered. For instance, the approach may comprise including the corresponding execution condition(s) in the final RRC message for the CPAC procedure. In some embodiments, one or more options to include the execution condition(s) may be utilized.

Option 1: The final RRC message for the CPAC may include/indicate the execution condition(s) generated by the MN or the SN. The MN may determine one or more execution conditions to include in the message.

Option 2: The final RRC message for the CPAC may include/indicate the execution condition(s) generated by the MN and SN simultaneously.

C. Instructing the Candidate SNs to Release Candidate PSCell Resources Upon CPAC Execution In CPAC, the wireless communication network may configure one or more candidate SNs. In some embodiments, the wireless communication device may select/identify/specify at least one candidate PSCell to perform a random access procedure toward the target SN. Therefore, the MN may inform/instruct/message one or more candidate SNs to release the reserved candidate PSCell resources and avoid resource waste.

The wireless communication device may send a first RRCReconfigurationComplete message (or other messages) to the MN responsive to receiving/obtaining a RRCReconfiguration message (or other messages) that includes a CPAC configuration. During the execution of the CPAC (e.g., one or more CPAC execution conditions are satisfied), the wireless communication device may send/transmit a second RRCReconfigurationComplete message, ULInformationTransferMRDC message, and/or other messages to the MN. The second message(s) may include an embedded RRCReconfigurationComplete message (or other messages) to the SN. In some embodiments, the wireless communication device may send/transmit a second RRCReconfigurationComplete message (or other messages) to the target SN via single radio bearer three (SRB3), if configured.

At least two cases and/or alternatives may be considered/evaluated according to whether the CPAC is involved/related/associated with the MN and/or the SRB3 configuration. The embodiments discussed herein are non-limiting examples that describe the at least two cases/alternatives. The operations and functionalities described in these cases/alternatives may be performed by any one or more of the components and/or operations described in connection with FIGS. 10, 11, 12, 13 and 14, such as operations 2120 to 2140, 3110, 4130 to 4160, 5140 to 5170, and 6130 to 6150.

Case 1: The wireless communication device may select/identify a candidate PSCell whose CPAC configuration is involved/related/associated with the MN (e.g., inter-SN candidate PSCell). In some embodiments, the wireless communication device may select/identify a candidate PSCell whose CPAC configuration is uninvolved/unrelated/unassociated with the MN (e.g., intra-SN CPC without MN involvement) and without SRB3 configuration. At least two alternatives may be considered/used to inform one or more candidate SNs.

Alternative 1: The MN may inform/instruct/message one or more candidate SNs to release the resources reserved for the CPAC via a novel Xn or X2 interface message (e.g., CPAC cancel message) or other messages. The MN may send/transmit a SN release message (or other messages) to the source SN if the selected/identified PSCell is different from an intra-SN candidate PSCell. The MN may inform the candidate SNs and/or send the release message to the source SN responsive to receiving/obtaining the second RRCReconfigurationComplete message, the ULInformationTransferMRDC message, and/or other messages, from the wireless communication device.

Alternative 2: The target SN may send/transmit a novel Xn or X2 interface message (e.g., CPAC success message) to inform the MN about the successful completion of the CPAC. The target SN may send/transmit the identification information of the target PSCell (e.g., the target PSCell frequency and PCI, the CGI, and/or other information) to the MN. The target SN may send the message and/or information responsive to completion of the random access to the target PSCell. In some embodiments, the MN may notify/inform one or more candidate SNs to release the resources reserved for the CPAC via a novel Xn or X2 interface message (e.g., CPAC cancel message) or other messages. The MN may send a SN release message (or other messages) to the source SN if the selected/identified PSCell is different from an intra-SN candidate PSCell. The MN may inform the candidate SNs and/or send the release message to the source SN responsive to receiving/obtaining the Xn or X2 interface message from the target SN.

Case 2: The wireless communication device may select/identify a candidate PSCell whose CPAC configuration is uninvolved/unrelated/unassociated with the MN (e.g., intra-SN CPC without MN involvement) and with SRB3 configuration. At least three alternatives may be considered/used to inform the MN.

Alternative 1: The wireless communication device may send/transmit the identification information of the target PSCell (e.g., the target PSCell frequency and PCI, the candidate cell ID, the candidate conditional reconfiguration index, and/or other information) to the MN via a RRC message (e.g., RRCReconfigurationComplete message or other messages). The wireless communication device may send the information responsive to completion of the random access to the target PSCell. In some embodiments, the MN may notify/inform one or more candidate SNs to release the resources reserved for the CPAC via a novel Xn or X2 interface message (e.g., CPAC cancel message) or other messages. The MN may inform the candidate SNs responsive to receiving/obtaining the RRC message from the wireless communication device.

Alternative 2: The wireless communication device may send/transmit the identification information of the target PSCell (e.g., the target PSCell frequency and PCI, the candidate cell ID, the candidate conditional reconfiguration index, and/or other information) to the MN via a RRC message (e.g., RRCReconfigurationComplete message or other messages). The wireless communication device may send the information responsive to the triggering of the CPAC execution (e.g., at least one CPAC execution condition is met/satisfied). In some embodiments, the MN may notify/inform one or more candidate SNs to release the resources reserved for the CPAC via a novel Xn or X2 interface message (e.g., CPAC cancel message) or other messages. The MN may inform the candidate SNs responsive to receiving/obtaining the RRC message from the wireless communication device.

Alternative 3: The SN may send a novel Xn or X2 message (e.g., CPAC success message or other messages) to inform the MN about the completion of the CPAC. The SN may send the identification information of the target PSCell (e.g., the target PSCell frequency and PCI, the CGI, and/or other information) to the MN. The SN may send the messages and/or information responsive to receiving/obtaining a RRCReconfigurationComplete message over the SRB3. In some embodiments, the MN may notify/inform one or more candidate SNs to release the resources reserved for the CPAC via a novel Xn or X2 interface message (e.g., CPAC cancel message) or other messages. The MN may inform the candidate SNs responsive to receiving/obtaining the Xn or X2 interface message from the target SN.

The aforementioned PSCell identification information may be sent/transmitted/transferred to the MN using at least one of the following options:

Option 1: A Xn or X2 interface message (or other messages) may include/provide/specify the target PSCell identification information. For example, a CPAC success message (or other messages) may include the PSCell identification information as one or more information elements.

Option 2: A RRC message (e.g., CG-Config message or other messages) may include/provide/specify the target PSCell identification information. In some embodiments, the CPAC success message (or other messages) may include the RRC message as one or more information elements.

D. Modifying or Cancelling the Configured Candidate PSCell

In some embodiments, both an initiation node (e.g., the MN and/or the source SN) and a target node (e.g., the target SN) may trigger/initiate the modification and/or cancellation of the CPAC configuration. The initiation node may trigger/initiate the modification and/or cancellation if the node receives updated measurement results related/associated to the target SN from the wireless communication device. In some embodiments, the CPAC modification and/or cancellation procedure may be performed using at least one of the following alternatives. The embodiments discussed herein are non-limiting examples that describe the alternatives.

Alternative 1: The initiation node may decide/determine to modify/cancel one or more configured candidate PSCells based on the updated measurement results. The initiation node may inform/instruct/message the target SN to modify/cancel the CPAC configuration for the related PSCell (e.g., trigger a CPAC modification/cancellation procedure initiated by the initiation node). The message may include an indication specifying the PSCell information to be modified/cancelled (e.g., the frequency, the frequency and PCI, the CGI, and/or other information) to the target SN.

Alternative 2: The initiation node may send/transmit the updated measurement results (e.g., candidateCellInfoListMN, candidateCellInfoListSN, and/or other information) to the target SN. In some embodiments, the target SN may modify/cancel the configured candidate PSCell by itself (e.g., trigger a target SN initiated CPAC modification/cancel procedure).

In some embodiments, the initiation node may correspond to the source SN. Therefore, the source SN may send/transmit the information to the target SN via the MN.

In the case of CPAC modification initiated by the initiation node, the CPAC modification and/or cancellation procedure may be performed using at least one of the following alternatives. The embodiments discussed herein are non-limiting examples that describe the alternatives.

Alternative 1: The initiation node may request to modify the CPAC configuration.

The initiation node may send/transmit a Xn or X2 interface message (e.g., CPAC modification request message or other messages) to the target SN to request to modify the CPAC configuration. The message may include the measurement results related/associated to the target SN, the updated source secondary cell group (SCG) configuration, the identification information of the PSCell to be modified (e.g., the frequency, the frequency and the PCI, or the CGI), and/or other information.

In some embodiments, the initiation node may correspond to the source SN. Therefore, the source SN may send/transmit the message (e.g., SN change required message, CPAC modification request message, or other messages) to the MN. The MN may transfer/send the message to the target SN requesting to modify/cancel the CPAC configuration for the associated PSCell.

Alternative 2: The initiation node may request to release the prior CPAC configuration and add a novel CPAC configuration (e.g., replace the prior CPAC configuration with a novel one).

Step 1: The initiation node may send/transmit a Xn or X2 interface message (e.g., CPAC cancel message) or other messages to the target SN to release the CPAC configuration for the related PSCell. The message may include the identification information of the PSCell to be released/modified (e.g., frequency, frequency and PCI, CGI, or other information) and/or an indication to specify the release procedure is related/associated to the CPAC modification.

Step 2: The initiation node may send a Xn or X2 interface message (e.g., SN addition request message and/or SN change required message) or other messages to the target SN to request a novel CPAC configuration for the related PSCell. The message may include the identification information of the PSCell to be added/modified (e.g., frequency, frequency and PCI, CGI, and/or other information), the updated source SCG configuration, the updated measurement results (e.g., candidateCellInfoListMN, candidateCellInfoListSN, and/or other information) related/associated to the target SN and/or an indication to specify the addition procedure is related to the CPAC modification.

The indication to specify that the release/addition procedure is related to the CPAC modification may be transferred/sent to the target SN using at least one of the following options:

Option 1: A Xn or X2 interface message may include the indication (e.g., include the CPAC replace) as one or more information elements in the SN (SgNB) addition request message, SN (SgNB) change required message, the CPAC cancel message, and/or other messages.

Option 2: The Xn or X2 interface message may include the indication as the "cause" value (e.g., set the "cause" value to CPAC replace) in the SN (SgNB) addition request message, SN (SgNB) change required message, the CPAC cancel message, and/or other messages.

In some embodiments, the initiation node may correspond to the source SN. Therefore, the source SN may send/transmit/transfer a message (e.g., SN change required message, CPAC cancel message, or other messages) to the MN. The MN may send a message (e.g., SN addition request message, CPAC cancel message, or other messages) to the target SN requesting to modify/cancel the CPAC configuration for the related/associated PSCell.

a. Embodiment 1: MN Initiated CPAC Modification

Figure 4:
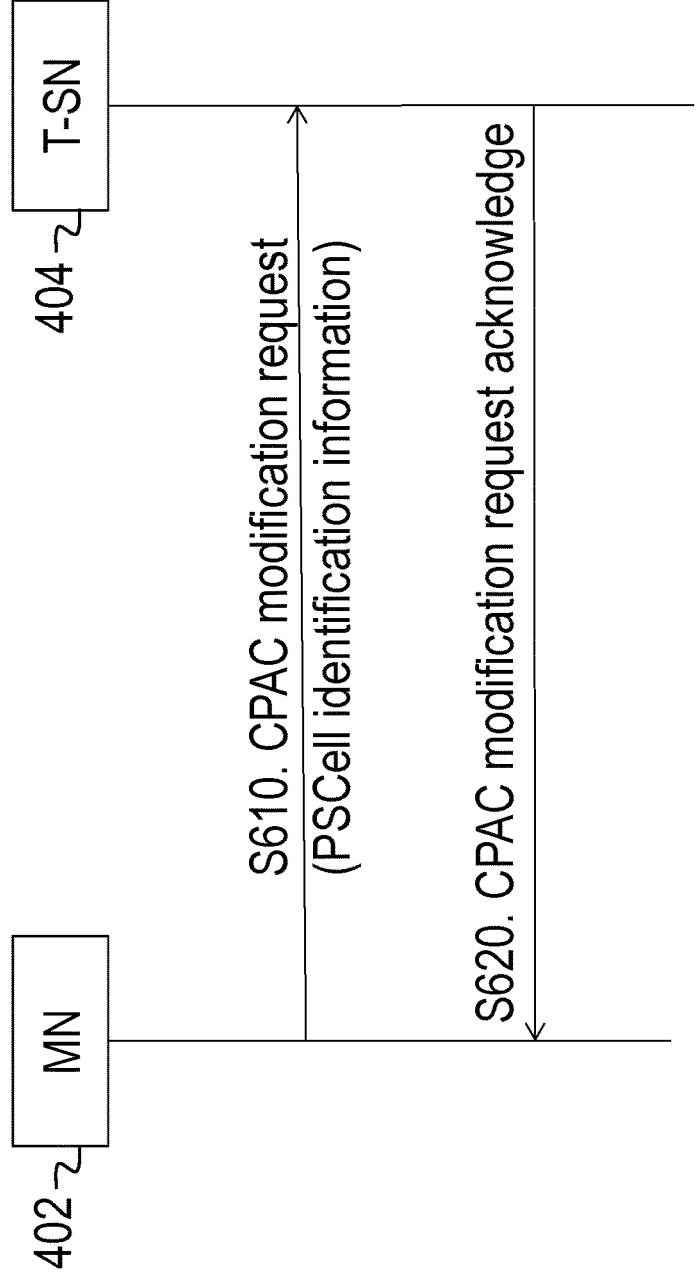
FIGS. 4-5 illustrate various approaches for a process for CPAC modification initiated by the MN, in accordance with some embodiments of the present disclosure.

Referring now to FIG. 4, depicted is a communication diagram of an embodiment for a process 400 for CPAC modification initiated by the MN 402. The embodiment for process 400 may be used for the aforementioned alternative 1. Under process 400, the MN 402 may send/transfer/transmit a CPAC modification request message to the target SN 404 (610). The CPAC modification request message (or other messages) may specify/provide a request to modify CPAC configuration for one or more candidate PSCells. The message may include measurement results related to the target SN 404, the source SCG configuration, the identification information of the PSCell to be modified (e.g., frequency, frequency and PCI and/or CGI), and/or other information. The SN 404 may send/transmit a CPAC modification request acknowledge message (or other messages) to the MN 402 (620). The CPAC modification request acknowledge message (or other messages) may include the updated CPAC configuration for the related candidate PSCell.

b. Embodiment 2: MN Initiated CPAC Modification

Figure 5:
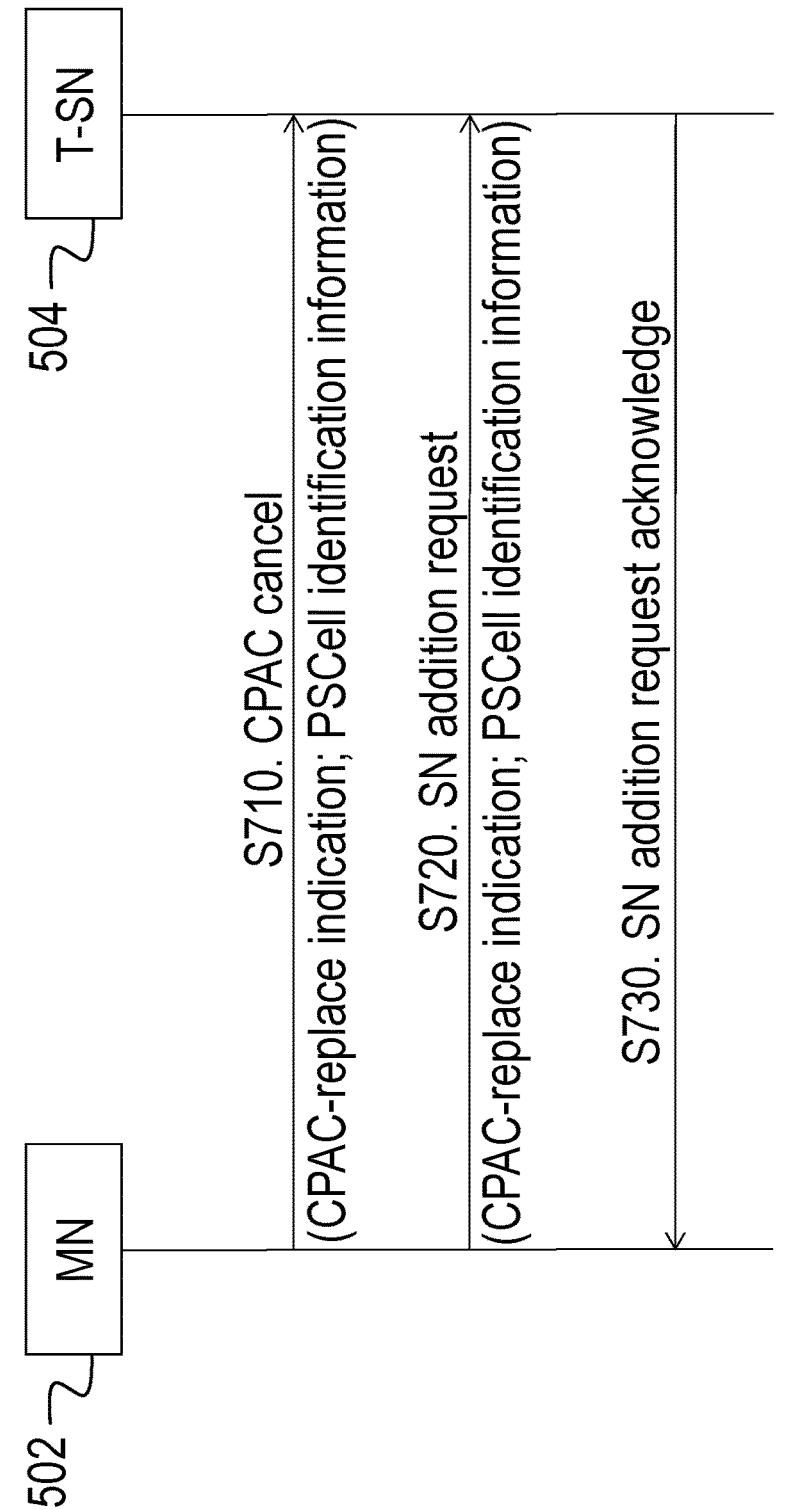

Referring now to FIG. 5 depicted is a communication diagram of an embodiment for a process 500 for CPAC modification initiated by the MN 502. The embodiment for process 500 may be used for the aforementioned alternative 2. Under process 500, the MN 502 may send/transfer/transmit a CPAC cancel message to the target SN 504 (710). Responsive to receiving the message, the target SN 504 may release the CPAC configuration for the PSCell to be modified. The message may include the identification information of the PSCell to be released/modified (e.g., frequency, frequency and PCI and/or CGI), an indication (e.g., indication to specify that the release procedure is related to the CPAC configuration), and/or other information.

In some embodiments, the MN 502 may send/transmit a X2 or Xn interface message (e.g., a SN addition request message) to the target SN 504 (720). The SN addition request message (or other messages) may provide/specify a request for a novel CPAC configuration for the related PSCell. The message may include the identification information of the PSCell to be added/modified (e.g., frequency, frequency and PCI and/or CGI), the updated SCG configuration, the updated measurement results (e.g., candidateCellInfoListMN, candidateCellInfoListSN, or other results) related to the target SN 504, an indication (e.g., indication to specify that the addition procedure is related to the CPAC modification), and/or other information. The target SN 504 may send/transmit a SN addition request message to the MN 502 (730). The message may include the updated CPAC configuration for the related candidate PSCell.

c. Embodiment 3: Source SN Initiated CPAC Modification

Figure 6:
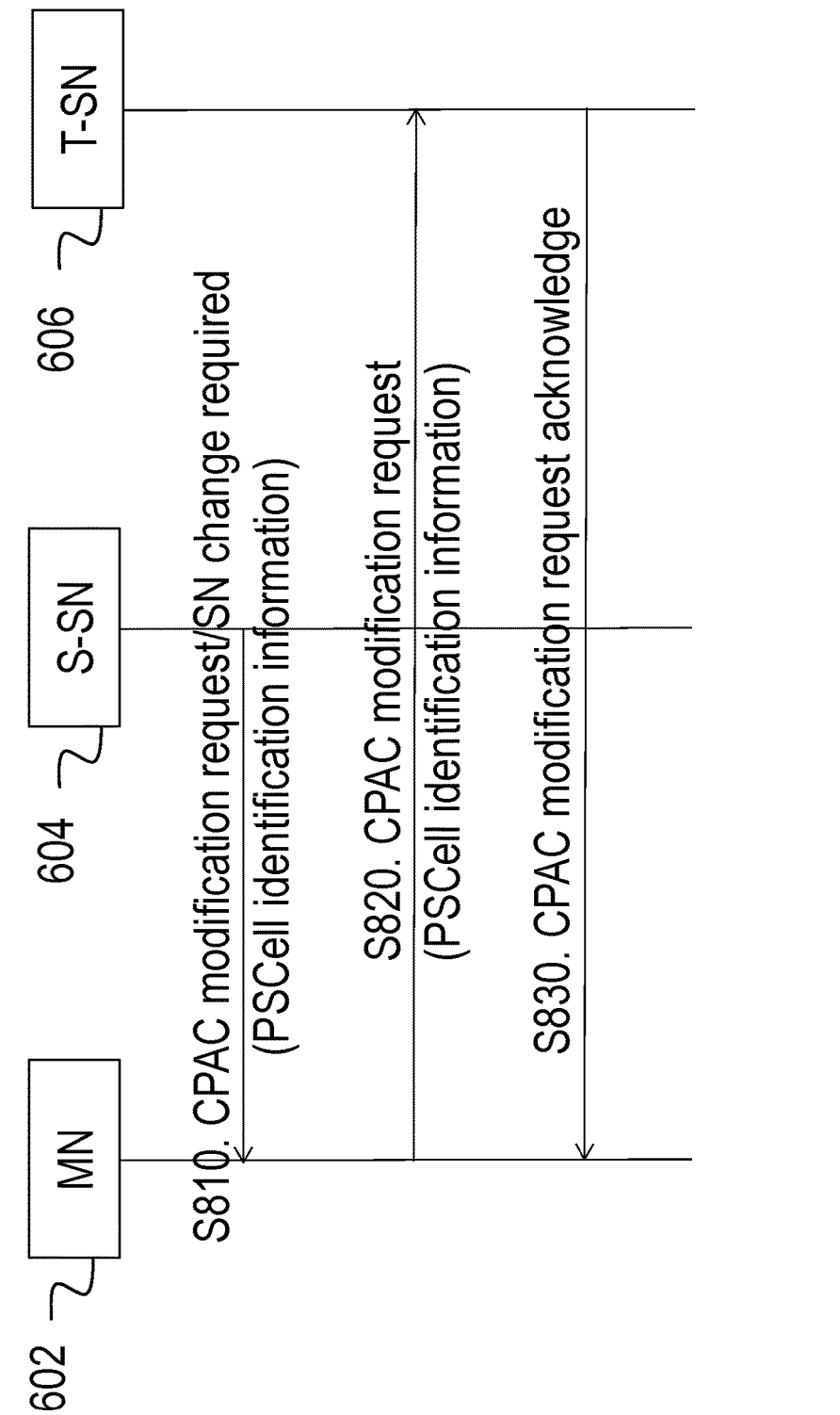
FIGS. 6-7 illustrate various approaches for a process for CPAC modification initiated by the source SN, in accordance with some embodiments of the present disclosure.

Referring now to FIG. 6 depicted is a communication diagram of an embodiment for a process 600 for CPAC modification initiated by the source SN 604. The embodiment for process 600 may be used for the aforementioned alternative 1. Under process 600, the source SN 604 may send/transmit a message (e.g., SN change required message, CPAC modification request message, and/or other messages) to the MN 602 (810). The message may provide/specify a request to modify the CPAC configuration for one or more candidate PSCells. The message may include the measurement results related to the target SN 606, the source SCG configuration, the identification information of the PSCell to be modified (e.g., frequency, frequency and PCI, and/or CGI) and/or other information.

In some embodiments, the MN 602 send/transmit a CPAC modification request message (or other messages) to the target SN 606 (820). The message may provide a request to modify the CPAC configuration for one or more candidate PSCells. The message may include the measurement results related to the target SN 606, the source SCG configuration, the identification information of the PSCell to be modified (e.g., frequency, frequency and PCI, and/or CGI) and/or other information. The target SN 606 may send/transmit a CPAC modification request acknowledgement message (or other messages) to the MN 602 (830). The message may include the updated CPAC configuration for the related candidate PSCell and/or other information.

d. Embodiment 4: Source SN Initiated CPAC Modification

Figure 7:
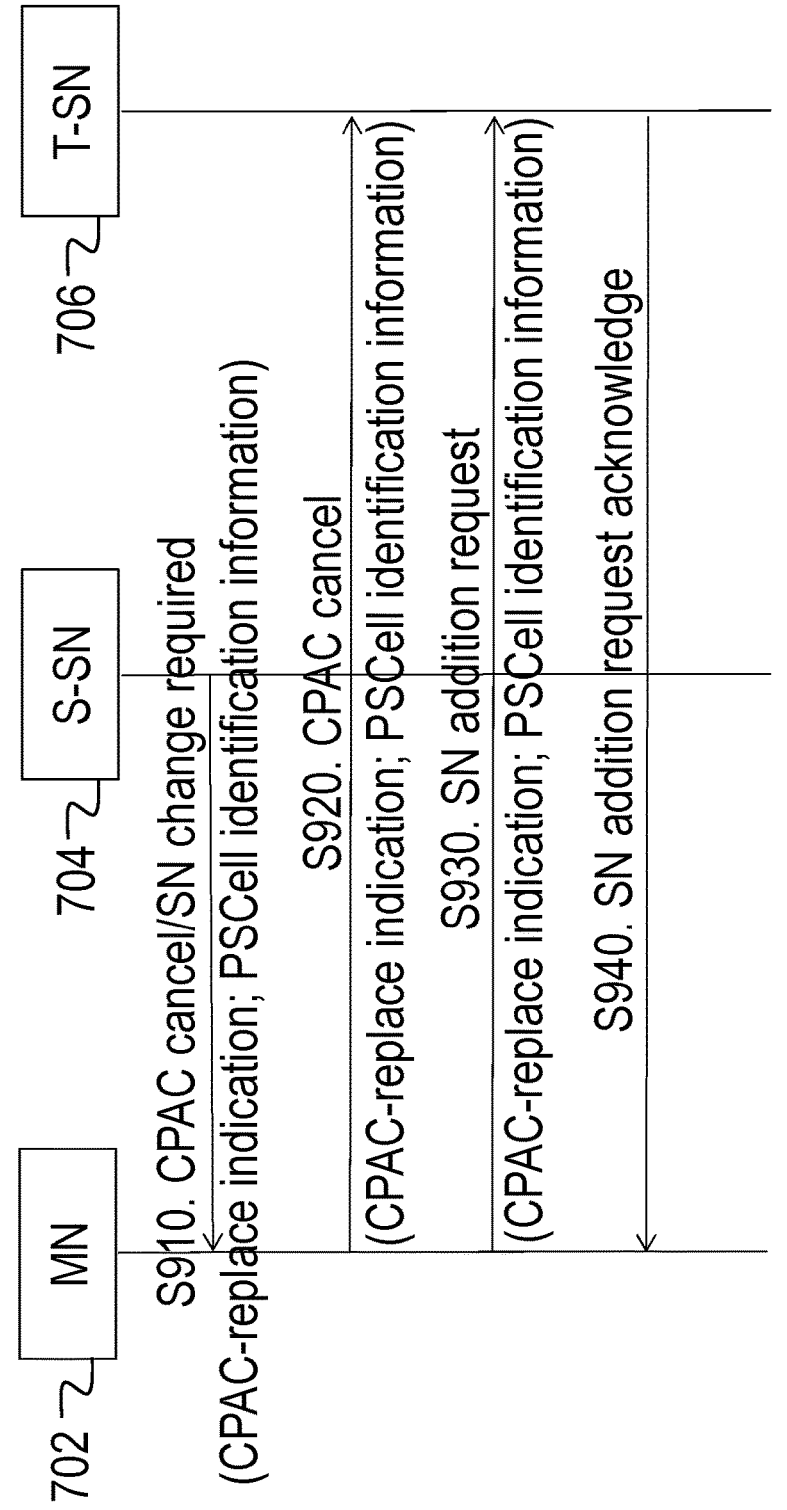

Referring now to FIG. 7 depicted is a communication diagram of an embodiment for a process 700 for CPAC modification initiated by the source SN 704. The embodiment for process 700 may be used for the aforementioned alternative 2. Under process 700, the source SN 704 may send/transmit a message (e.g., CPAC cancel message, SN change required message, and/or other messages) to the MN 702 (910). The message may provide a request to release the CPAC configuration for the PSCell to be modified. The message may include the identification information of the PSCell to be modified (e.g., frequency, frequency and PCI, and/or CGI), the updated source SCG configuration, the updated measurement results (e.g., candidateCellInfoListMN, candidateCellInfoListSN, and/or other results) related to the target SN 706, an indication (e.g., indication to specify that the procedure is related to the CPAC modification), and/or other information.

In some embodiments, the MN 702 may send/transfer a CPAC cancel message (or other messages) to the target SN 706 (920). Responsive to receiving the message, the target SN 706 may release the CPAC configuration for the PSCell to be modified. The message may include the identification information of the PSCell to be released/modified (e.g., frequency, frequency and PCI, and/or CGI), an indication (e.g., indication to specify that the release procedure is related to the CPAC modification), and/or other information.

The MN 702 may send a SN addition request message (or other messages) to the target SN 706 (930). The message may provide a request for a novel CPAC configuration for the related PSCell. The message may include the identification information of the PSCell to be added/modified (e.g., frequency, frequency and PCI, and/or CGI), the updated source SCG configuration, the updated measurement results (e.g., candidateCellInfoListMN, candidateCellInfoListSN, and/or other results) related to the target SN 706, an indication (e.g., an indication to specify that the addition procedure is related to the CPAC modification), and/or other information. The target SN 706 may send/transfer a SN addition request acknowledgement message (or other messages) to the MN 702 (940). The message may include the updated CPAC configuration for the related candidate PSCell and/or other information.

At least one of the following alternatives may be used to perform the CPAC modification initiated by the target SN. The embodiments discussed herein are non-limiting examples that describe the alternatives.

Alternative 1: The target SN may request to modify the CPAC configuration.

The target SN may send/transmit a Xn or X2 interface message (e.g., CPAC modification message or other messages) to the MN to request to modify the CPAC configuration for the related PSCell. The message may include the updated CPAC configuration, the identification information of the PSCell to be modified (e.g., the frequency, the frequency and the PCI, or the CGI), and/or other information.

Alternative 2: The target SN may request the MN to cancel/remove the prior CPAC configuration for the related PSCell. The MN may request the target SN to add a novel CPAC configuration for the related PSCell (e.g., replace the prior CPAC configuration with a novel one).

Step 1: The target SN may send/transmit a Xn or X2 interface message (e.g., CPAC cancel message) or other messages to the MN to release the CPAC configuration for the related PSCell. The message may include the identification information of the PSCell to be released/modified (e.g., frequency, frequency and PCI, CGI, or other information) and/or an indication to specify the release procedure is related/associated to the CPAC modification.

Step 2: The MN may send a Xn or X2 interface message (e.g., SN addition request message) or other messages to the target SN to request a novel CPAC configuration for the related PSCell. The message may include the identification information of the PSCell to be added/modified (e.g., frequency, frequency and PCI, CGI, and/or other information), the updated source SCG configuration, the updated measurement results (e.g., candidateCellInfoListMN, candidateCellInfoListSN, and/or other information) related/associated to the target SN and/or an indication to specify the addition procedure is related to the CPAC modification.

The indication to specify that the release/addition procedure is related to the CPAC modification may be transferred/sent to the MN and/or the target SN using at least one of the following options:

Option 1: A Xn or X2 interface message may include the indication (e.g., include the CPAC replace) as one or more information elements in the SN (SgNB) addition request message, the CPAC cancel message, and/or other messages.

Option 2: The Xn or X2 interface message may include the indication as the "cause" value (e.g., set the "cause" value to CPAC replace) in the SN (SgNB) addition request message, the CPAC cancel message, and/or other messages.

e. Embodiment 5: Target SN Initiated CPAC Modification

Figure 8:
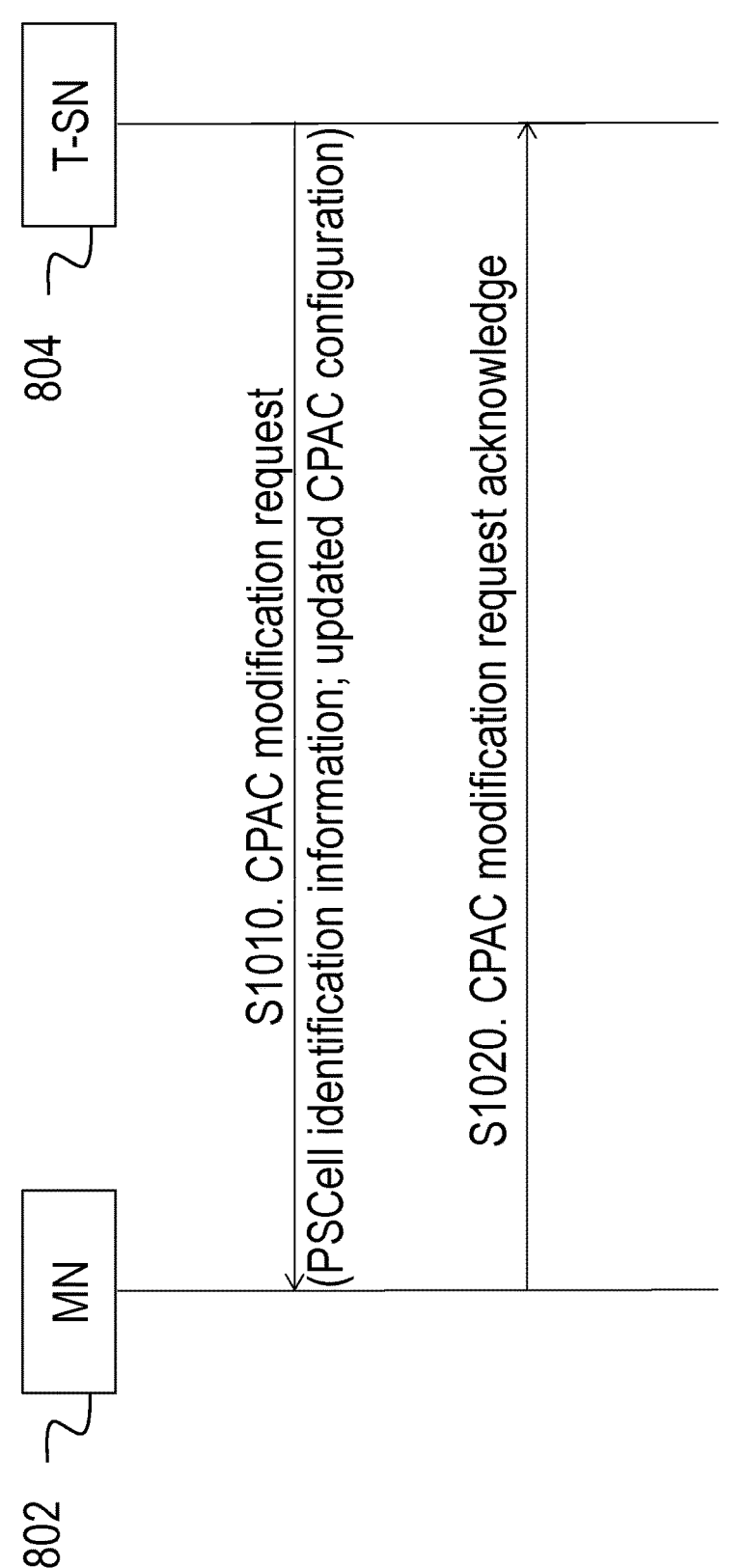
FIGS. 8-9 illustrate various approaches for a process for CPAC modification initiated by the target SN, in accordance with some embodiments of the present disclosure.

Referring now to FIG. 8 depicted is a communication diagram of an embodiment for a process 800 for CPAC modification initiated by the target SN 804. The embodiment for process 800 may be used for the aforementioned alternative 1. Under process 800, the target SN 804 may send/transmit a CPAC modification request message (or other messages) to the MN 802 (1010). The message may provide a request to modify the CPAC configuration for the related PSCell. The message may include the updated CPAC configuration, the identification information of the PSCell to be modified (e.g., frequency, frequency and PCI, and/or CGI), and/or other information. The MN 802 may send/transmit a CPAC modification request acknowledgement message to the target SN 804 to confirm the modification (1020).

f. Embodiment 6: Target SN Initiated CPAC Modification

Figure 9:
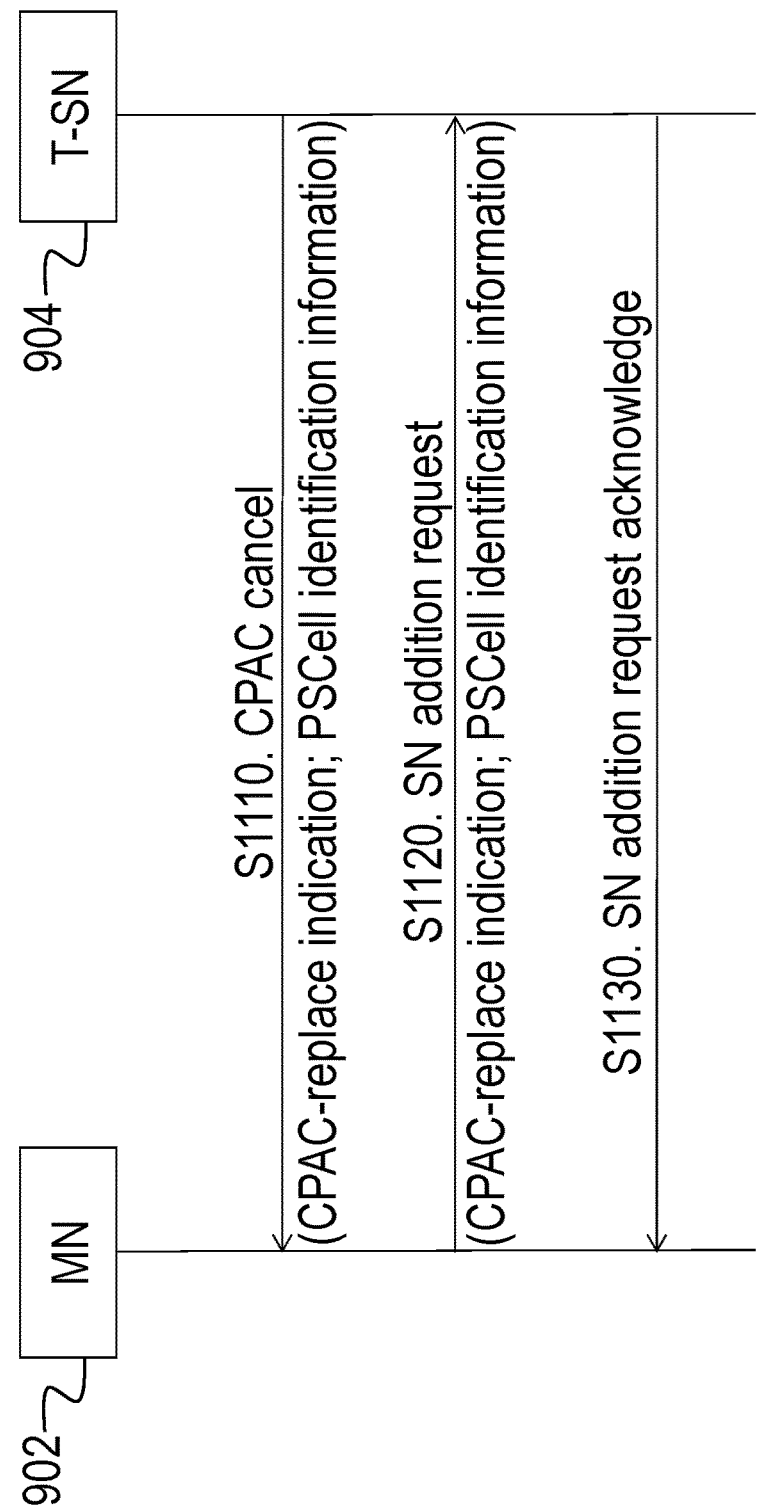

Referring now to FIG. 9 depicted is a communication diagram of an embodiment for a process 900 for CPAC modification initiated by the target SN 904. The embodiment for process 900 may be used for the aforementioned alternative 2. Under process 900, the target SN 904 may send/transmit a CPAC cancel message (or other messages) to the MN 902 (1110). The message may provide a request to release the CPAC configuration for the related PSCell. The message may include the identification information of the PSCell to be released/modified (e.g., frequency, frequency and PCI, and/or CGI), an indication to specify that the release procedure is related to the CPAC modification, and/or other information.

In some embodiments, the MN 902 may send a SN addition request message (or other messages) to the target SN 904 (1120). The message may provide a request for a novel CPAC configuration for the related PSCell. The message may include the indication information of the PSCell to be added/modified (e.g., frequency, frequency and PCI, and/or CGI), the updated source SCG configuration, the updated measurement results (e.g., candidateCellInfoListMN, candidateCellInfoListSN, and/or other results) related to the target SN 904, an indication (e.g., indication to specify that the addition procedure is related to the CPAC modification), and/or other information. The target SN 904 may send an SN addition request acknowledge message (or other messages) to the MN 902 (1130). The message may include the updated CPAC configuration for the related candidate PSCell.

E. Handling the Stored CPAC Configuration in Case of the PCell Change

In CPAC, the network may send/transfer a PCell change command (e.g., RRCReconfiguration message) to the wireless communication device. The network may send the command prior to meeting the execution condition(s) for CPAC. In some embodiments, the wireless communication device may perform/execute the PCell change at once. The execution of the PCell change may impact/affect the stored configuration of the wireless communication device. Therefore, one or more approaches for executing the PCell change and handling the CPAC configuration stored by the wireless communication device may be considered.

In some embodiments, the wireless communication device may delete/remove the CPAC configuration responsive to the PCell change. In PCell change without SN involvement (e.g., intra-MN PCell change without PSCell change), the stored CPAC configuration may be utilized after completing the PCell change. In some embodiments, the SN may be uninformed about the PCell change procedure. Therefore, the SN may be unaware of whether the stored CPAC configuration is released by the wireless communication device. The configuration mismatch between the SN and the wireless communication device may cause a subsequent configuration failure. Therefore, an information exchange procedure may be required/enabled/implemented (e.g., using a X2 or Xn interface message or other messages) to inform the SN of the executed PCell change. The information exchange procedure may be used for a PCell change without SN involvement. The network may configure the release of the stored CPAC configuration (e.g., responsive to the PCell change) to avoid an unnecessary release of the CPAC configuration.

The network (e.g., source/target MN and/or source SN) may send/transmit an indicator to the wireless communication device via a dedicated RRC message (e.g., RRCReconfiguration message) and/or broadcast signaling (e.g., system information block). The indicator may cause the wireless communication device to maintain/store the CPAC configuration responsive to the PCell change. For example, the RRCReconfiguration message and/or system information block message (or other messages) may include the indicator as one or more information elements. In another example, the conditionalReconfiguration IE in the RRCReconfiguration message may include the indicator as one or more information elements.

In some embodiments, inter-node interaction may be used to determine whether to maintain/store the CPAC configuration.

a. MN and SN Interaction in the Case of a PCell Change without SN Involvement

At least one of the following alternatives may be used to perform the interaction between the MN and the SN. The embodiments discussed herein are non-limiting examples that describe the alternatives.

Alternative 1: The MN may inform/indicate the SN about a PCell change without SN involvement.

Step 1: The MN may send/transmit an indication to the SN. The indication may inform the SN about a PCell change without SN involvement. In some embodiments, the MN may send the indication via a X2 or Xn interface message (or other messages).

Step 2: The SN may determine to release the CPAC configuration. If the SN determines to maintain the CPAC configuration, the SN may inform/instruct the wireless communication device to maintain/store the CPAC configuration. The SN may inform the wireless s communication device by generating a RRCReconfiguration message (or other messages) including an indicator.

Alternative 2: The MN may inform/indicate the SN about a PCell change without SN involvement. The MN may inform/instruct/request the SN to release the CPAC configuration.

Step 1: The MN may send a request to the SN to release the pre-configured CPAC configuration using an indication. The indication may inform the SN of the PCell change without SN involvement via a X2 or Xn interface message (or other messages).

Step 2: The SN may determine to accept/receive the request from the MN. If the MN rejects the request from the MN, the SN may send/transmit a reject message (or other messages) to the MN.

Step 3: In some embodiments, the MN may receive/obtain the reject message from the SN. If the MN receives the reject message, the MN may send an indicator via the RRCReconfiguration message (or other messages) to the wireless communication device. The indicator may inform/instruct/request the wireless communication device to maintain/store the CPAC configuration.

The indication for the PCell change without SN involvement may be transferred/sent to the SN using at least one of the following options.

Option 1: A Xn or X2 interface message (or other messages) may include the indication (e.g., PCell change without SN involvement). For example, the SN (SgNB) modification request message and/or other messages may include the indicator as one or more information elements.

Option 2: A Xn or X2 interface message (or other messages) may include the indication as a "cause" value (or other values). For example, the "cause" value of the SN (SgNB) modification request message may be set/modified to indicate/specify "MN mobility without SN involvement".

Option 3: A RRC message (or other messages) may include/specify the indication (e.g., PCell change without SN involvement). For example, a CG-ConfigInfo message may include the indication. A SN (SgNB) modification request message (or other messages) may include the RRC message as one or more information elements.

b. Source and Target Interaction in the Case of a CPAC with MN Involvement

In CPAC without MN involvement, the MN may generate/configure the final RRC message (or other messages) that includes the CPAC configuration. Therefore, the MN may be aware of whether the wireless communication device stores/maintains the CPAC configuration. If the MN initiates/triggers a PCell change, the source MN may send/transfer/transmit the CPAC related information to the target MN. Responsive to receiving the information, the target MN may determine to release the CPAC configuration stored/maintained by the wireless communication device.

In some embodiments, the source MN may send/transmit a handover request message (or other messages) to the target MN that includes the CPAC related information. The CPAC related information may comprise a CPAC indicator to specify the CPAC has been configured, the CPAC configuration, and/or other information. The target MN may send/transfer the CPAC related information using at least one of the following options:

Option 1: A Xn or X2 interface message (or other messages) may include the CPAC related information (e.g., a CPAC indicator, a CPAC configuration encapsulated in a container, and/or other information). For example, the handover request message and/or other messages may include the information as one or more information elements.

Option 2: A RRC message (e.g., a HandoverPreparationInformation message or other messages) may include/specify the CPAC related information (e.g., a CPAC indicator, a CPAC configuration encapsulated in a container, and/or other information). A handover request message (or other messages) may include the RRC message as one or more information elements.

In some embodiments, the target MN may determine to release the CPAC configuration. If the MN determines to maintain/store the CPAC configuration, the MN may inform/instruct the wireless communication device to maintain the CPAC configuration. The MN may use an indicator in a RRCReconfiguration message (or other messages) to inform the wireless communication device.

In some embodiments, the target MN may transfer/transmit/send the received CPAC information to the target SN. The MN may transfer the CPAC information to the target SN using at least one of the following options.

Option 1: A Xn or X2 interface message (or other messages) may include the CPAC related information (e.g., a CPAC indicator, a CPAC configuration encapsulated in a container, and/or other information). For example, a SN (SgNB) addition request message and/or other messages may include the information as one or more information elements.

Option 2: A RRC message (e.g., a CG-ConfigInfo message or other messages) may include/specify the CPAC related information (e.g., a CPAC indicator, a CPAC configuration encapsulated in a container, and/or other information). The SN (SgNB) addition request message (or other messages) may include the RRC message as one or more information elements.

F. Overall Procedure for CPAC a. Embodiment 1: MN Initiated Conditional SN Change (MN Initiated Inter-SN CPC)

Figure 10:
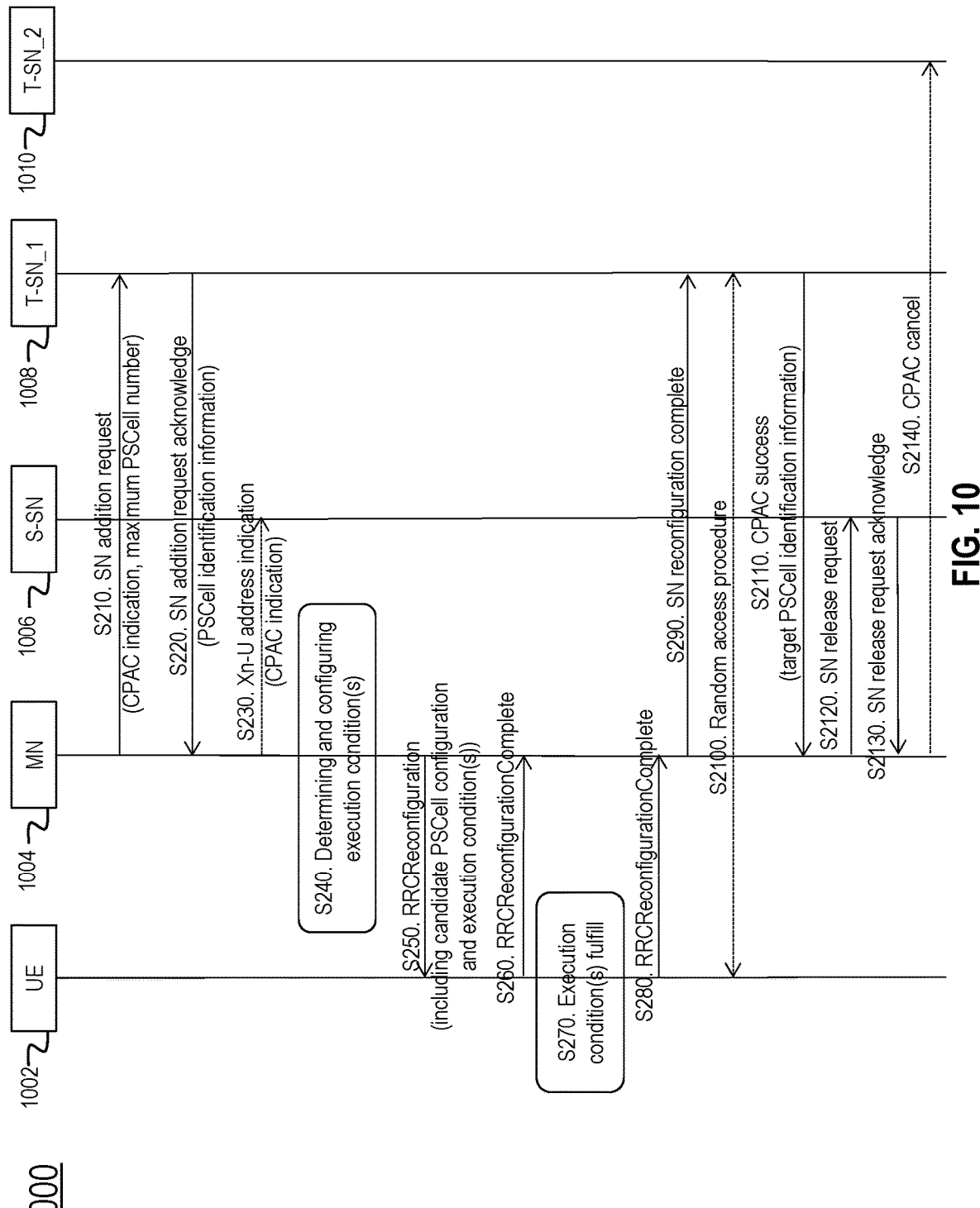
FIG. 10 illustrates example approaches for a conditional SN change initiated by the MN, in accordance with some embodiments of the present disclosure.

Referring now to FIG. 10 depicted is a communication diagram of an embodiment for a process 1000 for a conditional SN change initiated by the MN 1004. During the MN 1004 initiated SN change, the target SN 1008 may select/identify/determine the target PSCell. The target SN 1008 may utilize the measurement results related to the target SN 1008 to select the candidate PSCell. The MN 1004 may provide/specify the measurement results to the target SN 1008. During the MN initiated SN change, the target SN 1008 may generate/configure the configuration of the candidate PSCell. One or more target SNs may be considered during the MN initiated SN change.

Under process 1000, the MN 1004 may initiate/trigger the SN change by sending a request to the target SN 1008 (210). The request may comprise a request to allocate one or more resources for the wireless communication device 1002 by using the SN addition procedure. The MN 1004 may send/transmit a SN addition request message (or other messages) to the target SN 1008. The message may include the measurement results related to the target SN 1008, an indication (e.g., a CPAC indication and/or an indication to specify that the procedure corresponds to a conditional based procedure), and/or other information. In some embodiments, the MN 1004 may include an indication in the message to specify the maximum number of candidate PSCells to be configured by the target SN 1008.

In some embodiments, the target SN 1008 may receive/obtain the SN addition request and/or select the candidate PSCell and SCells. The target SN 1008 may select/identify the PSCell and/or SCells by using the measurement results related to the target SN 1008. The target SN 1008 may allocate one or more resources for the wireless communication device 1002. The target SN 1008 may generate/determine the configuration of the target PSCell and/or SCell. The target SN 1008 may send/transmit a SN addition request acknowledge (or other messages) to the MN 1004 (220). The SN addition request acknowledge may include the identification information of the target PSCell (e.g., PSCell frequency, PSCell frequency and PCI, CGI, and/or other information).

In some embodiments, the MN 1004 may send/transmit a message (e.g., Xn-U address indication message or other messages) to the source SN 1006 (230). If data forwarding is used, the message may provide/specify one or more data forwarding addresses. Responsive to receiving the message, the source SN 1006 may perform early data forwarding for the SN-terminated bearers. The source SN 1004 may send/transmit an early status transfer message (or other messages) to the source MN, if applicable. The message transmitted by the MN 1004 (e.g., to the source SN 1006) may include an indicator to specify whether the procedure is a CPAC-based procedure. For example, the message may include a CPAC indicator. The MN 1004 may determine the execution condition(s) for the candidate PSCell specified in operation 220 (240).

In some embodiments, the MN 1004 may send a RRCReconfiguration message (or other messages) including the CPAC configuration to the wireless communication device 1002 (250). The CPAC configuration may include at least the configuration of the candidate PSCell (e.g., the RRCReconfiguration message generated by the target SN 1008) and/or the corresponding execution condition(s). The wireless communication device 1002 may send a RRCReconfigurationComplete message (or other messages) to the MN 1004 to confirm the reception of the RRCReconfiguration message (260).

In some embodiments, the wireless communication device 1002 may maintain the communication with the source SN 1006 and/or evaluate the execution condition(s) (270). If at least one execution condition is met/satisfied, the wireless communication device 1002 may select/identify/determine the associated cell as the target PSCell. The wireless communication device may trigger/initiate the execution of the CPAC to access the target SN 1008.

During the execution of the CPAC, the wireless communication device 1002 may send/transmit a RRCReconfigurationComplete message (or other messages) to the MN 1004 (280). The message may include an embedded RRCReconfigurationComplete to the target SN 1008 and/or other information. The message may indicate/include the selected candidate PSCell information (e.g., target PSCell frequency and PCI, candidate cell ID, and/or candidate conditional reconfiguration index) and/or other information. Responsive to receiving the RRCReconfigurationComplete message from the wireless communication device 1002, the MN 1002 may begin data forwarding toward the target SN 1008, notify the source SN 1006 to release the wireless communication device 1002 connection, and/or inform another candidate SN to release the reserved PSCell resources for the CPAC.

In some embodiments, the MN 1004 may send/transfer a SN reconfiguration complete message (or other messages) to the target SN 1008 (290). The MN 1004 may send the message according to the specified candidate PSCell information. The wireless communication device 1002 may perform a random access procedure toward the target PSCell of the SN 1008 (2100). The wireless communication device 1002 may send the RRCReconfigurationComplete message and/or perform the random access procedure in an arbitrary order (e.g., the order of operations 280, 290 and 2100 is arbitrary).

If the random access procedure is complete, the target SN 1008 may send a message (e.g., CPAC success message or other messages) to the MN 1004 (2110). The message may inform the MN 1004 of the completion of the CPAC procedure. The message may include the identification information of the target PSCell (e.g., the PSCell frequency, the PSCell frequency and PCI, and/or the CGI) and/or other information. Responsive to receiving the success message, the MN 1004 may begin the data forwarding toward the target SN 1008, notify/instruct the source SN 1006 to release the wireless communication device 1002 connection, and/or inform/instruct another candidate SN to release the reserved PSCell resources for the CPAC.

In some embodiments, the MN 1004 may initiate/trigger the release of the source SN 1006 resources (2120). For example, the MN 1004 may send a SN release request (or other messages) to the source SN 1006 to initiate the release of the resources. The source SN 1006 may confirm the release of the SN resources by sending a SN release request acknowledge message (or other messages) to the MN 1004 (2130). The MN 1004 may send a Xn or X2 interface message (e.g., CPAC cancel message or other messages) to another candidate SN 1010 (2140). The message may inform/instruct/notify the other candidate SN 1010 to release the reserved candidate PSCell resources. The order of operations 2120, 2130, and 2140 is arbitrary.

b. Embodiment 2: Conditional SN Addition (MN Initiated Conditional PSCell Addition)

Figure 11:
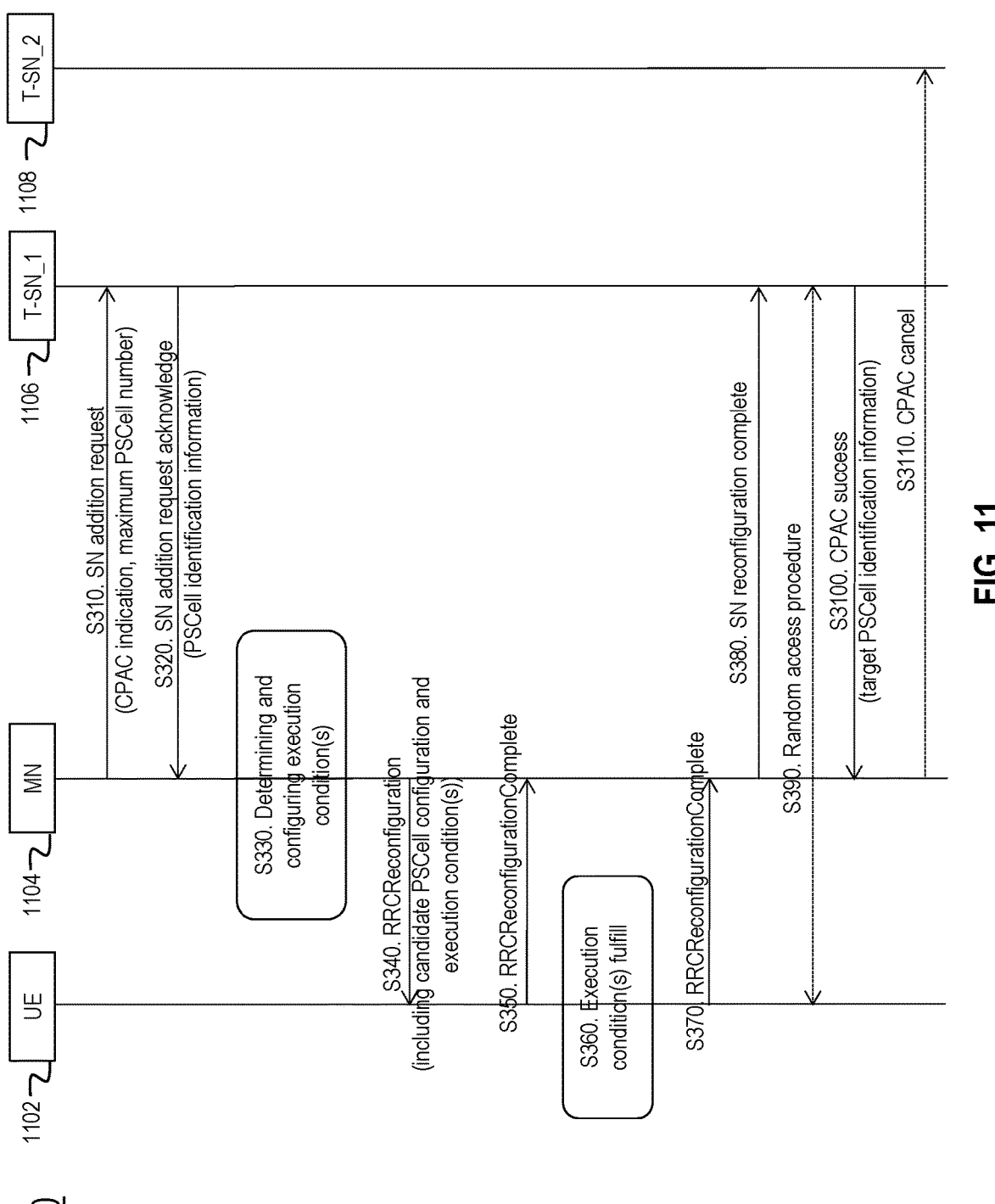
FIG. 11 illustrates example approaches for a conditional SN addition, in accordance with some embodiments of the present disclosure.

Referring now to FIG. 11 depicted is a communication diagram of an embodiment for a process 1100 for a conditional SN addition. In some embodiments, one or more target SNs may be considered/evaluated during this process.

The steps/operations of process 1100 (e.g., steps 310 to 3110) may each include one or more features described in connection with FIG. 10.

c. Embodiment 3 (Solution 1): SN Initiated Conditional SN Change (SN Initiated Inter-SN CPC)

Figure 12:
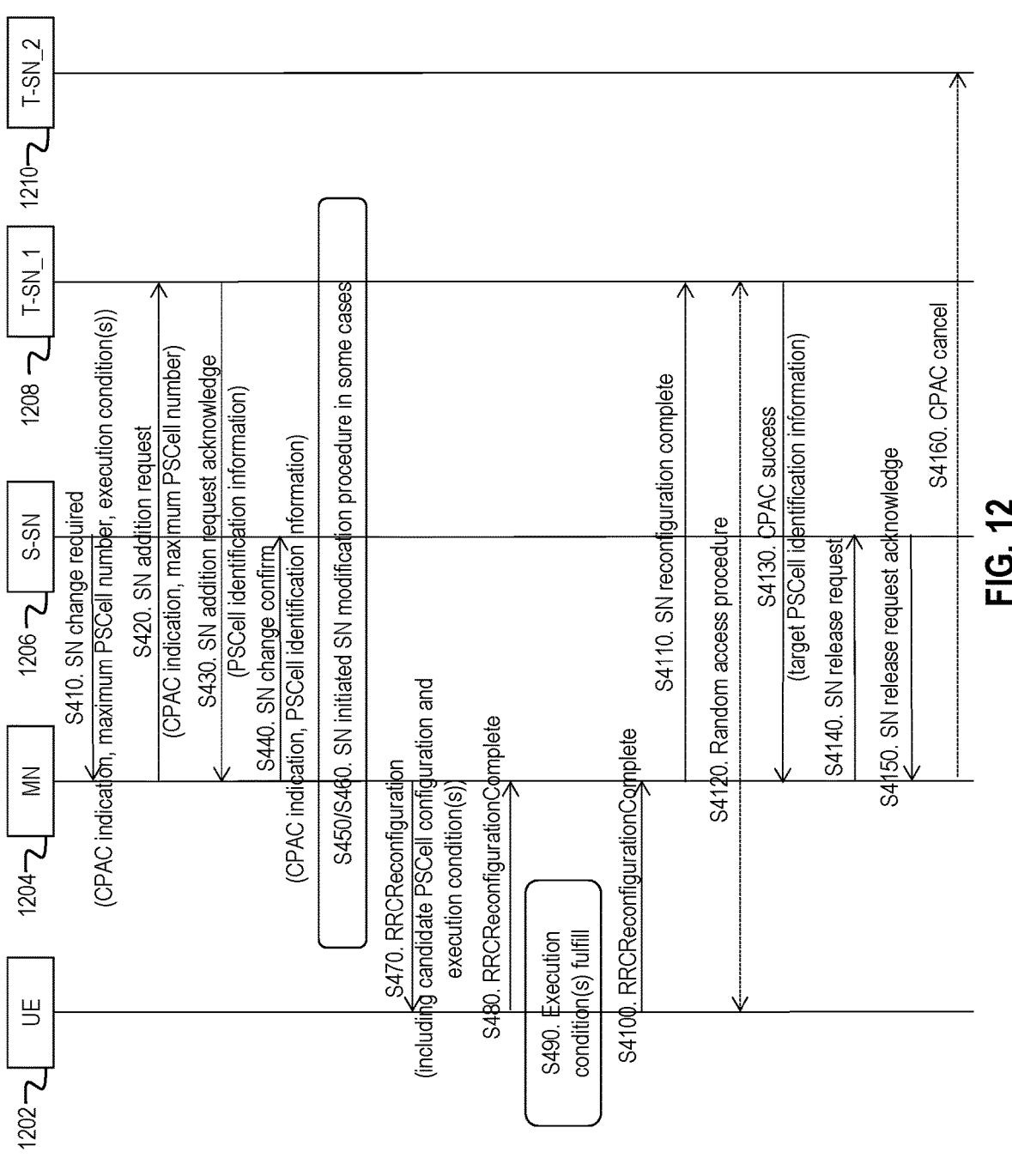
FIGS. 12-14 illustrate various approaches for a conditional SN change initiated by the SN, in accordance with some embodiments of the present disclosure.

Referring now to FIG. 12 depicted is a communication diagram of an embodiment for a process 1200 for a conditional SN change initiated by the SN. During the SN initiated SN change, the target SN may select/identify/determine the target PSCell. The target SN may determine the candidate PSCell by using/analyzing the measurement results related to the target SN. The source SN may provide the measurement results to the target SN. In some embodiments, the target SN may generate the configuration of the candidate PSCell. One or more target SNs may be considered/evaluated during process 1200.

Under process 1200, the source SN 1206 may initiate the conditional SN change procedure by sending/transmitting a SN change required message (or other messages) to the MN 1204 (410). The message may include a candidate target SN ID, the SCG configuration of the source SN 1206, measurement results related/associated to the target SN, and/or other information. The message may include the execution condition(s) for the candidate PSCell, an indication (e.g., CPAC indication or other indications) to specify the procedure is a conditional based procedure, and/or other information. In the message, the source SN 1206 may include an indication to specify the maximum number of candidate PSCells that can be configured by the target SN.

In some embodiments, the MN 1204 may send a request to allocate one or more resources for the wireless communication device 1202 to the candidate target SN 1208 (420). The candidate target SN 1208 may allocate the resources by using an SN addition procedure. In some embodiments, the target SN 1208 may receive/obtain the SN addition request and/or select the candidate PSCell and SCells. The target SN 1208 may select/identify the PSCell and/or SCells by using the measurement results related to the target SN 1208. The target SN 1208 may allocate one or more resources for the wireless communication device 1202. The target SN 1208 may generate/determine the configuration of the target PSCell and/or SCell. The target SN 1208 may send/transmit a SN addition request acknowledge (or other messages) to the MN 1204 (430). The SN addition request acknowledge may include the identification information of the target PSCell (e.g., PSCell frequency, PSCell frequency and PCI, CGI, and/or other information).

The MN 1204 may send/transmit a SN change confirm message (or other messages) to the source SN 1206 (440). The message may confirm the change of the source SN 1206. If data forwarding is needed, the MN 1204 may provide one or more data forwarding addresses to the source SN 1206. In some embodiments, the message may include the identification information of the candidate PSCell selected by the target SN 1208 (e.g., PSCell frequency, PSCell frequency and PCI, and/or CGI), an indicator to specify the procedure is a conditional based procedure (e.g., indicator may include a "CPAC indicator") to the source SN 1206, and/or other information. If the source SN 1206 receives/obtains the message with the CPAC indication, the source SN 1206 may continue providing user data (or other information) to the wireless communication device 1202.

In some embodiments, the source SN 1206 may fail to provide the execution condition(s) for the candidate PSCells in the SN change required message. Therefore, the source SN 1206 may initiate the SN initiated SN modification procedure (450/460). The source SN 1206 may initiate/trigger/cause the procedure by sending a SN modification required message (or other messages) to the MN 1204. The message may provide/indicate/specify the execution condition(s). The message may include the execution condition(s) related/associated to the candidate PSCells (e.g., a list of execution conditions per frequency and/or per frequency and PCI) and/or other information. Responsive to receiving the message, the MN 1204 may send/transmit a SN modification confirm message (or other messages) to the source SN 1206. Operations 470 to 4160 may each include one or more features in connection with FIG. 10.

In some embodiments, the wireless communication device 1202 may send/transmit the RRCReconfiguration-Complete message (or other messages) to the target SN via SRB3 (e.g., combining 4100 and 4110 into a single step).

d. Embodiment 4 (Solution 2): SN Initiated Conditional SN Change (SN Initiated Inter-SN CPC)

Figure 13:
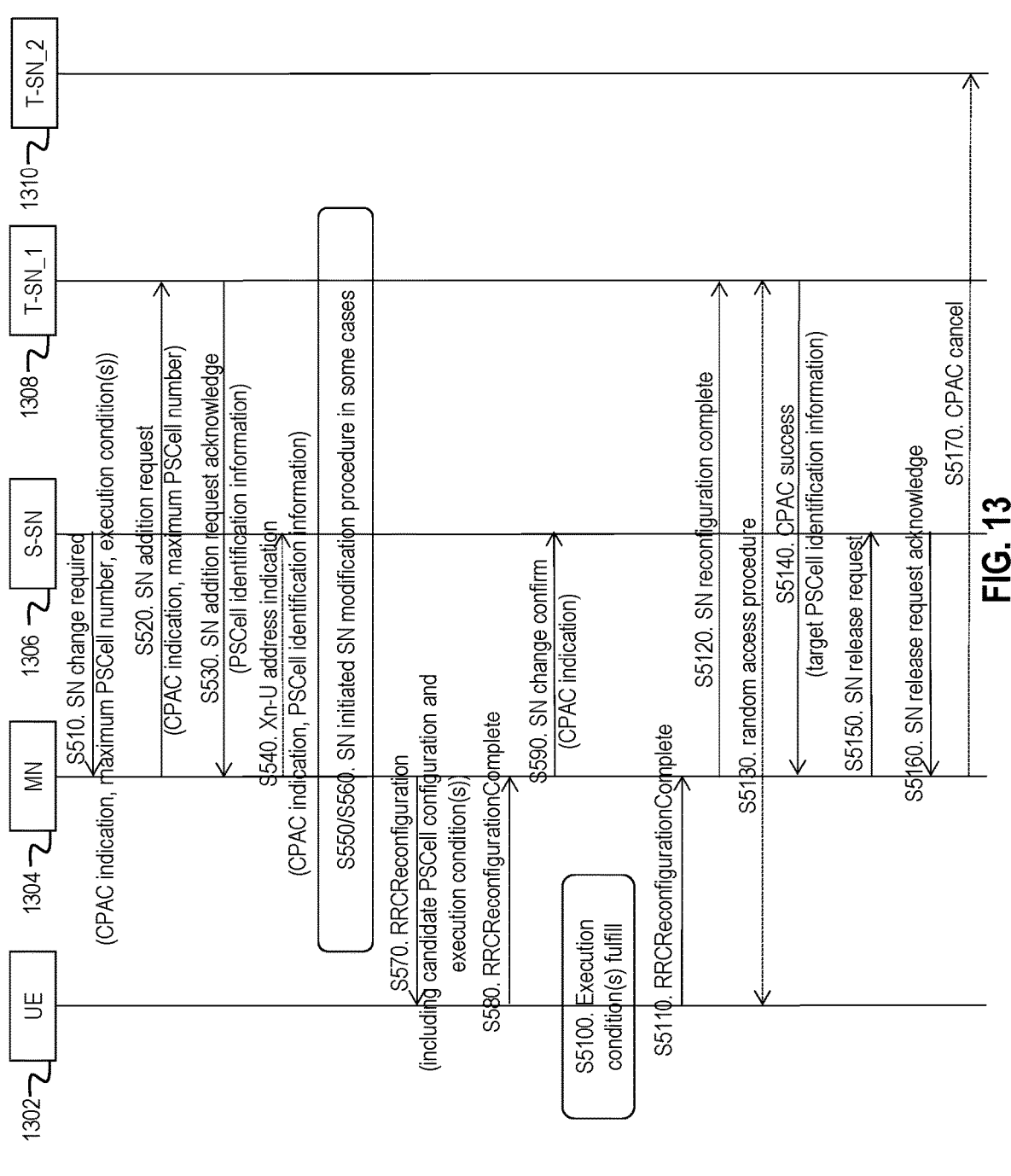

Referring now to FIG. 13 depicted is a communication diagram of an embodiment for a process 1300 for a conditional SN change initiated by the SN. One or more operations/steps of process 1300 (e.g., operations 510 to 530, 550 to 580, and 5100 to 5170) may each include one or more features in connection with FIG. 12.

If data forwarding is needed, the MN 1304 may send/transmit a message (e.g., Xn-U address indication message) to provide one or more data forwarding addresses to the source SN 1306 (540). Responsive to receiving the message, the source SN 1306 may perform early data forwarding for SN-terminated bearers. The source SN 1306 may send/transmit an early status transfer message (or other messages) to the source MN 1304. The message may include an indicator to specify the procedure is a conditional based procedure (e.g., message may include a "CPAC indicator"), the identification information of the candidate PSCell selected by the target SN (e.g., PSCell frequency, PSCell frequency and PCI, and/or CGI), and/or other information.

In some embodiments, the MN 1304 may send/transmit a SN change confirm message (or other messages) to the source SN 1306 (590). The message may provide/indicate/specify confirmation of the change of the source SN 1306. The message may include an indicator to specify the procedure is a conditional based procedure (e.g., message may include a "CPAC indicator") and/or other information. If the source SN 1306 receives the message with a CPAC indication, the source SN 1306 may continue to provide user data (or other information) to the wireless communication device 1302.

e. Embodiment 5 (Solution 3): SN Initiated Conditional SN Change (SN Initiated Inter-SN CPC)

Figure 14:
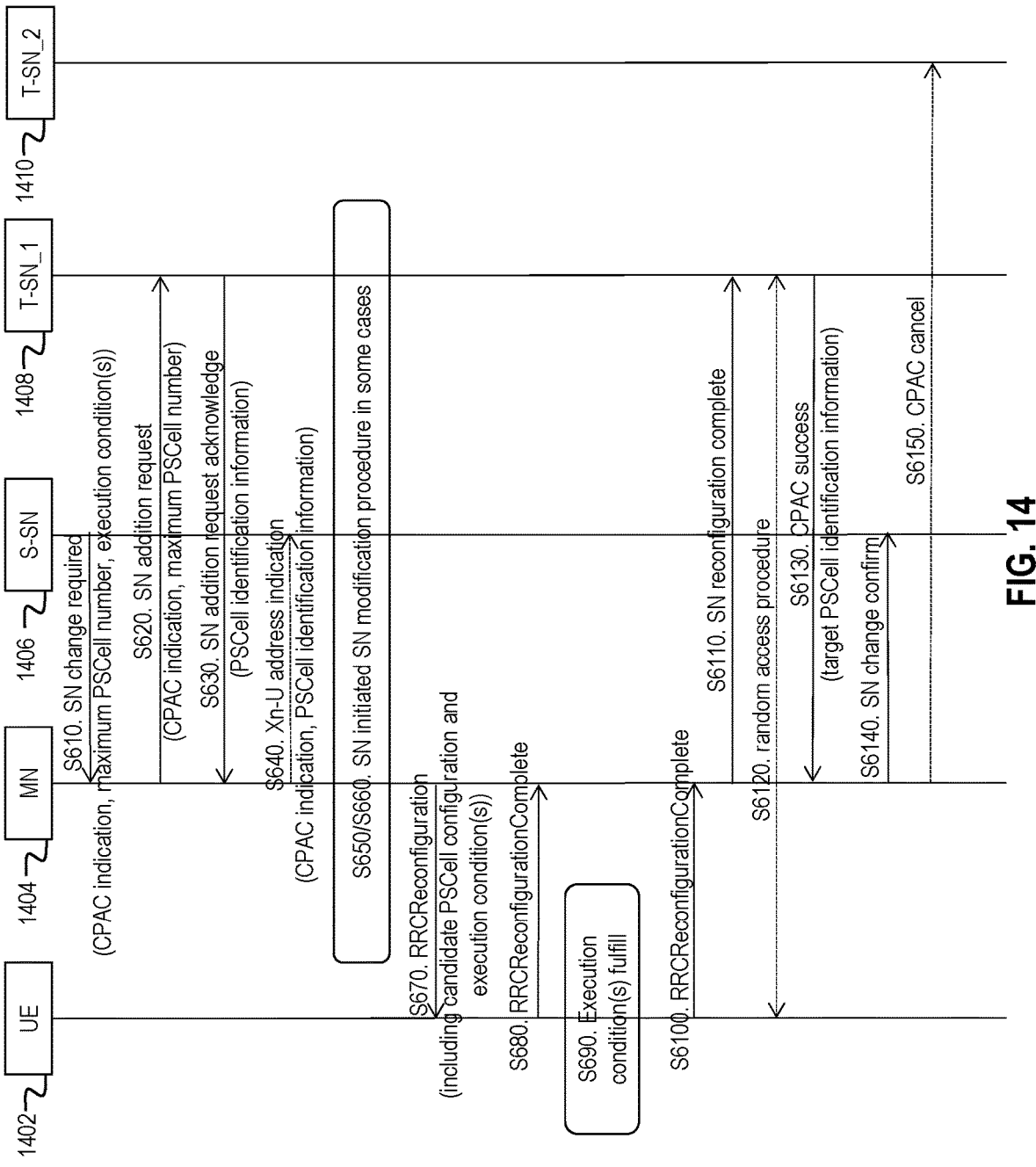

Referring now to FIG. 14 depicted is a communication diagram of an embodiment for a process 1400 for a conditional SN change initiated by the SN. One or more operations/steps of process 1400 (e.g., operations 610 to 6130, and 6150) may each include one or more features in connection with FIG. 13.

In some embodiments, the MN 1404 may send/transmit a SN change confirm message (or other messages) to the source SN 1406 (6140), responsive to receiving a message (e.g., CPAC success message or other messages) from the target SN. The message may provide a confirmation to release the source SN 1406 resources. Responsive to receiving the message, the source SN 1406 may be caused to cease providing user data (or other information) to the wireless communication device 1402. In some embodiments, the source SN 1406 may begin/initiate data forwarding.

f. Embodiment 6: SN Initiated Conditional SN Modification with MN Involvement (SN Initiated Intra-SN CPC with MN Involvement)

Figure 15:
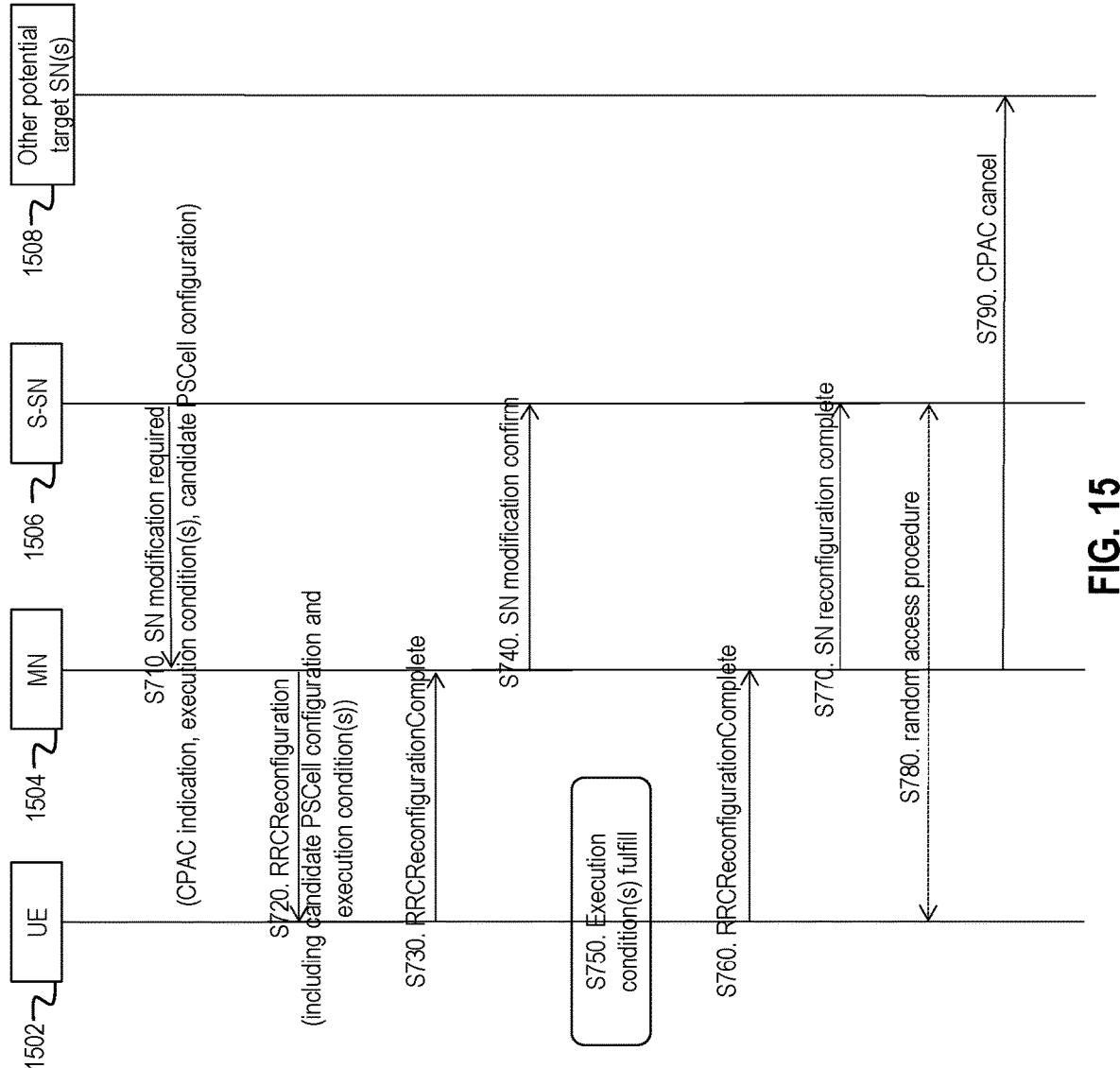
FIG. 15 illustrates example approaches for a conditional SN modification, initiated by the SN, with MN involvement, in accordance with some embodiments of the present disclosure.

Referring now to FIG. 15 depicted is a communication diagram of an embodiment for a process 1500 for a conditional SN modification, initiated by the SN, with MN involvement. During the source SN initiated SN modification without MN involvement, the source SN 1506 may select/identify/determine the candidate PSCell. The source SN 1506 may generate/configure the configuration of the candidate PSCell and/or the corresponding execution condition(s). One or more operations/steps of process 1500 (e.g., operations 720 to 730, and 750 to 760) may each include one or more features in connection with FIG. 14.

In some embodiments, the source SN 1506 may send/transmit a SN modification required message (or other messages) to the MN 1504 (710). The message may cause the initiation of the intra-SN CPC with MN involvement. The message may include one or more candidate PSCell configurations, the execution condition(s) for the candidate PSCell, an indication (e.g., CPAC indication) to specify the procedure is a conditional based procedure, and/or other information.

Responsive to receiving the SN modification required message, the MN 1504 may send/transmit a SN modification confirm message (or other messages) to the source SN 1506 (740). In some embodiments, the transmission of the SN modification confirm message may be excluded from operation 740 in the process. The MN 1504 may send the confirm message responsive to receiving/obtaining a second RRCReconfigurationComplete message from the wireless communication device 1502 (e.g., in operation 770). In some embodiments, the MN 1504 may transfer/send/transmit a SN reconfiguration complete message (or other messages) to the source SN 1506 (770). The message may indicate/signal the success of the CPAC procedure. In some embodiments, the MN 1504 may send the SN modification confirm message including the SN RRCReconfiguration-Complete message to the source SN 1506.

In some embodiments, the wireless communication device 1502 may perform synchronization toward the PSCell configured by the SN (780). In some embodiments, the wireless communication device 1502 may perform uplink transmissions after applying the new configuration. The MN 1504 may send/transmit a Xn or X2 interface message (e.g., CPAC cancel message or other messages) to other potential SN(s) 1508 (790). The message may inform the other potential SN(s) 1508 to release the reserved candidate PSCell resources.

G. Methods of Improving Mobility Reliability in PSCell Addition or Change

Figure 16:
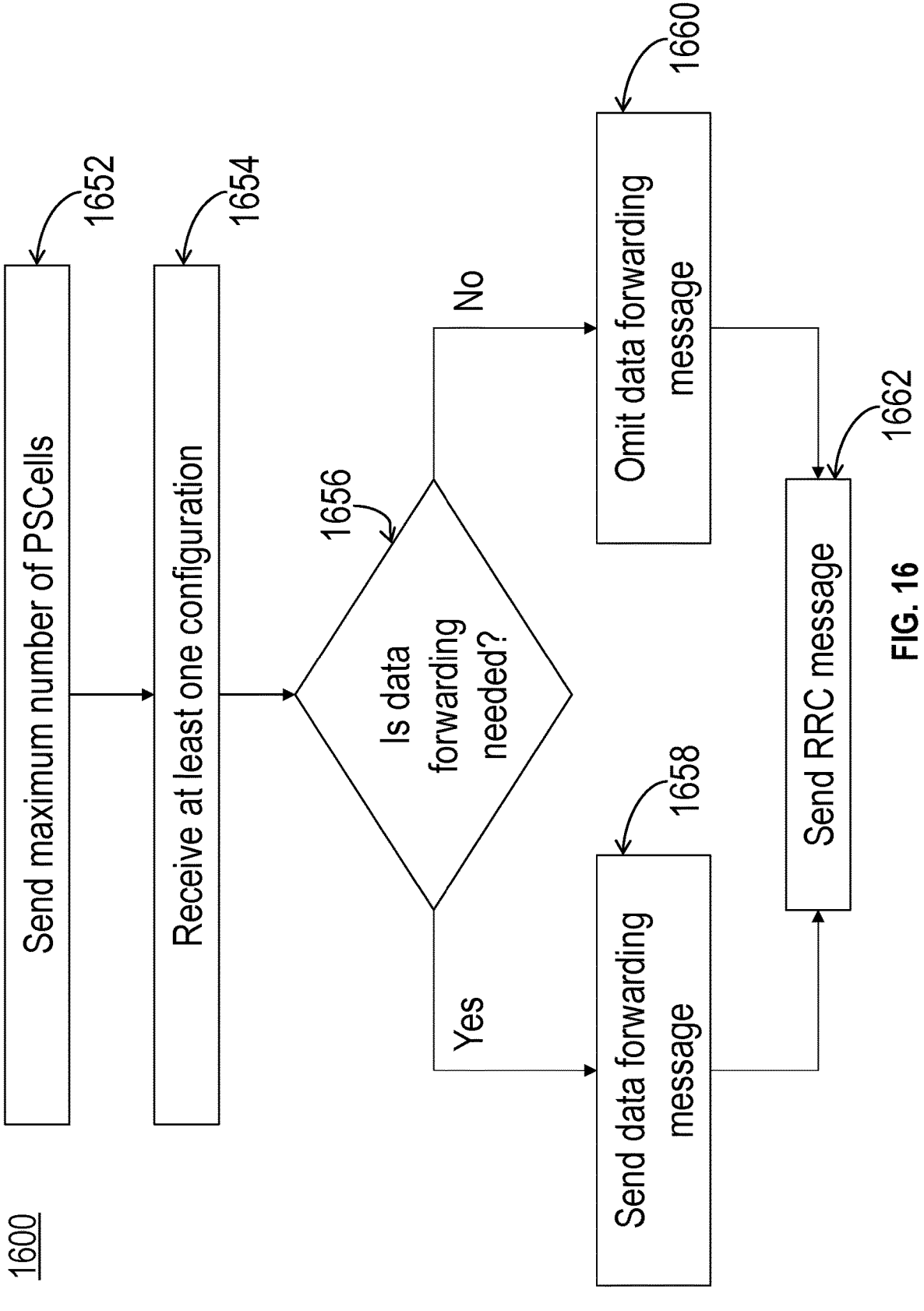
FIGS. 16-17 illustrate various flow diagrams of example methods for adding and changing conditional primary cells in a secondary cell group, in accordance with some embodiments of the present disclosure.

FIG. 16 illustrates a flow diagram of a method 1600 of improving mobility reliability in PSCell addition or change. The method 1600 may be implemented using any of the components and devices detailed herein in conjunction with FIGS. 1-15. In overview, the method 1600 may include sending a maximum number of PSCells (1652). The method 1600 may include receiving a message with at least one PSCell configuration (1654). The method 1600 may include determining whether data forwarding is needed (1656). The method 1600 may include sending a data forwarding message (1658). The method 1600 may include omitting the data forwarding message (1660). The method 1600 may include sending a RRC message (1662).

Referring now to operation (1652), and in some embodiments, a master node (MN) may send and/or transmit an indication of a maximum number of candidate primary cells in a secondary cell group (PSCells). Prior to sending the indication, the MN may determine the maximum number of candidate PSCells that can be configured by a target secondary node (SN). A target SN may receive/obtain the indication from the MN. The maximum number of candidate PSCells may be configured by the target SN. The MN may send/transmit the indication in an SN addition request message (or other messages). In some embodiments, the SN addition request message may include/provide/specify the indication of a maximum number of candidate PSCells in an information element.

Referring now to operation (1654), and in some embodiments, the MN may receive a message with at least one candidate PSCell configuration. The target SN may send/transmit the message to the MN. The message may comprise an SN addition request acknowledge message (or other messages). The MN may receive/obtain the message from the target SN in response to sending/transmitting the SN addition request message (or other messages).

Referring now to operation (1656), and in some embodiments, the MN may determine whether data forwarding is needed. If data forwarding is needed, the MN may send/transmit a data forwarding message with an indication to the source SN (1658). The MN may send the data forwarding message responsive to determining data forwarding is needed. The data forwarding message may include an indication that the data forwarding is for a conditional PSCell addition or change (CPAC) based procedure. The MN may send/transfer/transmit the indication using a Xn interface or X2 interface message (e.g., as in information element or a "cause" value) and/or other messages. Responsive to receiving the message, the source SN may decide to perform early data forwarding for SN-terminated bearers. If the MN determines data forwarding is unnecessary/unrequired, the MN may omit/skip the data forwarding message (1660). The data forwarding message (e.g., RRC message or other messages) may include/provide/specify the indication that the data forwarding is for a CPAC procedure in an information element.

Referring now to operation (1662), and in some embodiments, the MN may send/transmit a RRC message. The MN may send a RRC message to the wireless communication device that includes the at least one candidate PSCell configuration and/or one or more associated CPAC execution conditions. The MN may cause the wireless communication device to perform a CPAC procedure to the target SN responsive to sending the RRC message. A candidate PSCell may satisfy/meet at least one of the one or more CPAC execution conditions. If the candidate PSCell satisfies at least one condition, the wireless communication device may perform a CPAC procedure to the target SN. The wireless communication device may select/identify a candidate PSCell residing in a candidate SN other than the source SN. The wireless communication device may select a candidate PSCell residing in the source SN when a single radio bearer three (SRB3) is not configured. The wireless communication device may select the candidate PSCell to perform/execute a CPAC procedure to the selected candidate PSCell.

In some embodiments, the MN may receive/obtain a RRC message (or other messages) from the wireless communication device. The message may indicate execution of the CPAC procedure to the selected candidate PSCell. Responsive to receiving the RRC message, the MN may send/transmit/transfer a Xn interface or X2 interface message (or other messages) to one or more candidate SNs other than the target SN. The Xn interface or X2 interface message may cause the release of resources reserved for the CPAC procedure. In some embodiments, the MN may receive/obtain a Xn interface or X2 interface message (or other messages) from the target SN. The message may indicate successful completion of the CPAC procedure. The message may include identification information of the selected PSCell and/or other information. The MN may send/transmit/broadcast another Xn interface or X2 interface message to one or more candidate SNs other than the target SN. The message may cause/trigger the release of resources reserved for the CPAC procedure. In some embodiments, the MN may send a SN release message (or other messages) to the source SN. The MN may send the message when the selected PSCell is not a candidate PSCell residing in the source SN. The message may indicate release of resources of the source SN. The message may cause/trigger the source SN to stop providing user data (or other information) to the wireless communication device.

In some embodiments, the MN may determine whether to modify and/or cancel the CPAC configuration for one or more candidate PSCells. The MN may utilize/analyze measurement results related to the target SN to determine whether to modify and/or cancel the configuration(s). The MN may send/transmit a message to the target SN. The message may indicate to modify and/or cancel the CPAC configuration for the one or more candidate PSCells. The message may include/provide identification information (e.g., frequency, frequency and PCI, CGI, and/or other information) about the one or more candidate PSCells to be modified and/or canceled. In some embodiments, the target SN may receive/obtain the measurement results related to the target SN from the MN. The target SN may determine whether to modify and/or cancel the CPAC configuration for one or more candidate PSCells according to the measurement results (or other information). The target SN may send/transmit a message to the MN. The message may indicate to modify or cancel the CPAC configuration for the one or more candidate PSCells. The message may include/provide identification information (e.g., frequency, frequency and PCI, CGI, and/or other information) about the one or more candidate PSCells to be modified and/or canceled.

In some embodiments, the MN may send/transmit/broadcast a Xn interface or X2 interface message (or other messages) to the target SN. The message may include/provide a request to release the CPAC configuration for the configured candidate PSCell. The Xn interface or X2 interface message may include at least one of: identification information (e.g., frequency, frequency and PCI, CGI, and/or other information) about the configured candidate PSCell, and/or an indication that the release is related to replacing the CPAC configuration with a new CPAC configuration. In some embodiments, the target SN may send/transmit a Xn interface or X2 interface message (or other messages) to the MN. The message may include/provide a request to release a CPAC configuration for a configured candidate PSCell. The message may include at least one of: identification information about the configured candidate PSCell, and/or an indication that the release is related to replacing the CPAC configuration with a new CPAC configuration.

In some embodiments, the target SN may receive/obtain a Xn interface or X2 interface message (or other messages) from the MN. The message may include a request to add the new CPAC configuration. The message may include at least one of: identification information (e.g., frequency, frequency and PCI, CGI, and/or other information) of a PSCell to be modified, an updated source secondary cell group (SCG) configuration, the measurement results related to the target SN, and/or an indication that the addition is related to replacing the CPAC configuration with the new CPAC configuration. The Xn interface or X2 interface request/ message may include the indication that the release is related to replacing the CPAC configuration with a new CPAC configuration. The Xn interface or X2 interface request/ message may include the indication of the release in one or more information elements and/or a cause value. The Xn interface or X2 interface request/message may include the indication that the addition is related to replacing the CPAC configuration with a new CPAC configuration. The Xn interface or X2 interface request/message may include the indication of the addition in one or more information elements and/or a cause value.

In some embodiments, the MN may send/transmit/broadcast a Xn interface or X2 interface message (or other messages) to a source SN. The message may include an indication of a maximum number of cells allowed to be configured as candidate cells for the CPAC procedure. A RRC message (or other messages) may include the indication of a maximum number of cells. The Xn interface or X2 interface message (or other messages) may include/provide the RRC message. In some embodiments, the MN may receive/obtain a request from the source SN via a Xn interface or X2 interface message (or other messages). The source SN may send the request if the source SN determines more candidate cells are needed. The request may include a request for a reference number of cells (e.g., total and/or additional number of cells) allowed to be configured as candidate cells for the CPAC procedure. An RRC message may include/provide/specify the reference number of cells. The Xn interface or X2 interface message may include/ provide the RRC message. In some embodiments, the MN may determine whether to accept or reject the reference number of cells in the request.

Figure 17:
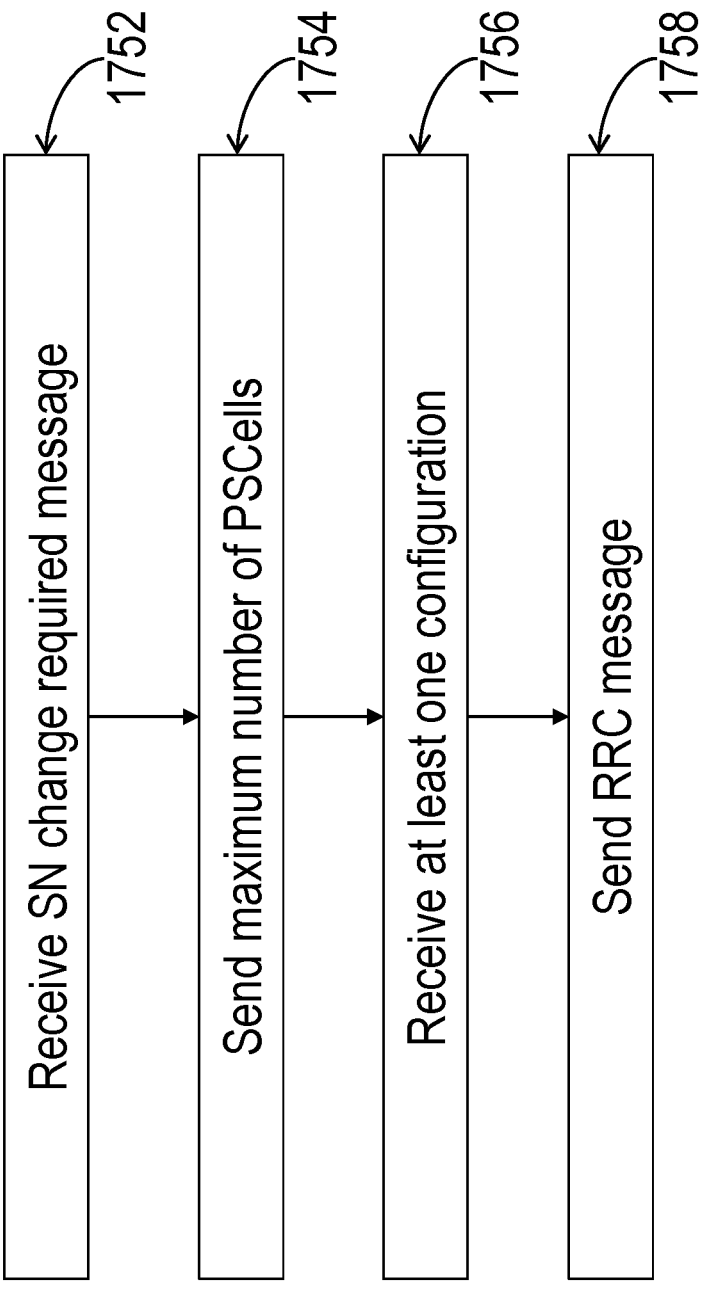

FIG. 17 illustrates a flow diagram of a method 1700 of improving mobility reliability in PSCell addition or change. The method 1700 may be implemented using any of the components and devices detailed herein in conjunction with FIGS. 1-15. In overview, the method 1700 may include receiving a SN change required message (1752). The method 1700 may include sending a maximum number of candidate PSCells (1754). The method 1700 may include receiving at least one configuration (1756). The method 1700 may include sending an RRC message (1758).

Referring now to operation (1752), and in some embodiments, the MN may receive a SN change required message. The source SN may send/transmit a SN change required message (or other messages) to the MN. The MN may receive/obtain a SN change required message (or other messages) from the source SN. The SN change required message may include/provide an indication of the maximum number of candidate PSCells that can be configured by a target SN and/or other information. In some embodiments, the MN may receive/obtain a Xn interface or X2 interface message (or other messages) from the source SN (e.g., SN initiated CPAC). The Xn interface or X2 interface message may provide a request to release a CPAC configuration for a configured candidate PSCell. The Xn interface message or X2 may include identification information (e.g., frequency, frequency and PCI, CGI, and/or other information) of the one or more candidate PSCells to be released or modified, an indication that the release is related to replacing the CPAC configuration with a new CPAC configuration, and/or other information. The MN may send/transmit another Xn interface or X2 interface message (or other messages) to the target SN. The another Xn interface or X2 interface message may provide a request to release the CPAC configuration for the configured candidate PSCell. The another Xn interface message or X2 may include identification information (e.g., frequency, frequency and PCI, CGI, and/or other information) of the one or more candidate PSCells to be released or modified, an indication that the release is related to replacing the CPAC configuration with a new CPAC configuration, and/or other information. In some embodiments, one or more information elements and/or a cause value of the Xn interface or X2 interface message may include/provide the indication that the release is related to replacing the CPAC configuration with the new CPAC configuration Referring now to operation (1754), and in some embodiments, the MN may send a maximum number of candidate PSCells. The MN may send/transmit/broadcast an indication of a maximum number of candidate PSCells to a target SN. The maximum number of candidate PSCells may be configured by the target SN. An SN addition request message (or other messages) may include/provide/specify the indication. In some embodiments, one or more information elements of the message (e.g., SN addition request message or other messages) may include/provide/specify the indication of a maximum number of candidate PSCells and/or other information. In some embodiments, the MN may send/transfer an indication to the source SN. The indication may specify a maximum number of cells allowed to be configured as candidate cells for the CPAC procedure. The MN may send the indication via another Xn interface or X2 interface message (or other messages). A RRC message (or other messages) may include/provide the indication of a maximum number of cells. The another Xn interface or X2 interface message may include/provide/specify the RRC message.

Referring now to operation (1756), and in some embodiments, the MN may receive a message with at least one PSCell configuration. The MN may receive at least one candidate PSCell configuration from the target SN responsive to the SN addition request message. An SN addition request acknowledge message (or other messages) may include/provide/indicate/specify the at least one candidate PSCell configuration. In some embodiments, the source SN may send/transmit measurement results (or other information) to the target SN that are related/associated to the target SN (e.g., SN initiated CPAC). The target SN may utilize the measurements results to determine whether to modify and/or cancel the CPAC configuration for one or more candidate PSCells.

In some embodiments, the MN may receive/obtain a Xn interface or X2 interface message (or other messages) from the target SN (e.g., target SN initiated CPAC modification). The message may provide a request to release a CPAC configuration for a configured candidate PSCell. The Xn interface or X2 interface message may include identification information of the one or more candidate PSCells to be released or modified, an indication that the release is related to replacing the CPAC configuration with a new CPAC configuration, and/or other information. In some embodiments, one or more information elements and/or a cause value of the Xn interface or X2 interface message may include/provide the indication that the release is related to replacing the CPAC configuration with the new CPAC configuration. In some embodiments, the MN may send/ transmit a Xn interface or X2 interface message (or other messages) to the target SN (e.g., SN initiated CPAC). The Xn interface or X2 interface message may provide a request to add the new CPAC configuration. The Xn interface or X2 interface message may include/provide identification information (e.g., frequency, frequency and PCI, CGI, and/or other information) of the one or more candidate PSCells to be added or modified, an updated SCG configuration, the measurement results related to the target SN, an indication that the addition is related to replacing the CPAC configuration with the new CPAC configuration, and/or other information. In some embodiments, one or more information elements and/or a cause value of the Xn interface or X2 interface message may include/provide the indication that the addition is related to replacing the CPAC configuration with the new CPAC configuration In some embodiments, the MN may send an indication of a change association. The MN may send/transmit/broadcast an indication to a source SN. The source SN may receive/ obtain the indication from the MN. The indication may specify that a change from the source SN to the target SN is associated with a CPAC based procedure. In some embodiments, a Xn interface or X2 interface message (or other messages) may provide/specify the indication. The MN may send the indication to the source SN to inform the source SN about the CPAC based procedure using the SN change confirm message (or other messages). In some embodiments, the source SN may determine whether to modify and/or cancel a CPAC configuration for one or more candidate PSCells. The source SN may utilize/analyze measurement results related to the target SN to determine whether to modify and/or cancel. The source SN may inform the target SN about the identification information of the one or more candidate PSCells to be modified and/or canceled.

One or more information elements of the Xn interface or X2 interface message (or other messages) may include/ provide/specify the indication that the change is associated with the CPAC based procedure. In some embodiments, the Xn interface or X2 interface message (or other messages) may include/provide/specify identification information (e.g., frequency, frequency and PCI, CGI, and/or other information) of one or more PSCells that have been configured by the target SN. The message may comprise/initiate a procedure to inform the source SN about the identification information in the case of a SN initiated conditional SN change. In some embodiments, the Xn interface or X2 interface message (or other messages) may be an address indication message. The message may provide/specify/indicate data forwarding information (or other information) to the source SN. In some embodiments, the Xn interface or X2 interface message is a SN change confirm message (or other messages). The SN change confirm message may confirm/ validate/authenticate the release of resources of the source SN. The SN change confirm message may indicate to the source SN to continue to provide user data (or other information) to an associated wireless communication device.

Referring now to operation (1758), and in some embodiments, the MN may send a RRC message. The MN may send/transmit a RRC message (or other messages) to a wireless communication device. The RRC message may include the at least one candidate PSCell configuration, one or more associated CPAC execution conditions, and/or other information. Responsive to receiving the message, the wireless communication device may perform a CPAC procedure to the target SN when a candidate PSCell satisfies at least one of the one or more CPAC execution conditions. In some embodiments, the wireless communication device may select/identify/determine a candidate PSCell residing in a candidate SN other than the source SN. The wireless communication device may select or a candidate PSCell residing in the source SN when a single radio bearer three (SRB3) is not configured. The wireless communication device may select a candidate PSCell to perform a CPAC procedure to the selected candidate PSCell.

Responsive to selecting the candidate PSCell, the wireless communication device may send/transmit a RRC message (or other messages) to the MN. The RRC message may indicate/specify execution of the CPAC procedure to the selected candidate PSCell. Responsive to the RRC message, the MN may send/transmit a Xn interface or X2 interface message (or other messages) to one or more candidate SNs other than the target SN. The MN may cause/trigger the release of resources reserved for the CPAC procedure by sending the message. In some embodiments, once the wireless communication device selects the candidate PSCell, the MN may receive/obtain a Xn interface or X2 interface message (or other messages) from the target SN. The Xn interface or X2 interface message may indicate/specify successful completion of the CPAC procedure. In some embodiments, the Xn interface or X2 interface message may include/provide identification information (e.g., frequency, frequency and PCI, CGI, and/or other information) of the selected candidate PSCell. The MN may send/transmit another Xn interface or X2 interface message (or other messages) to one or more candidate SNs other than the target SN. The MN may cause/trigger the release of resources reserved for the CPAC procedure by sending the Xn interface or X2 interface message.

In some embodiments, the source SN may receive/obtain another Xn interface or X2 interface message (or other messages) from the MN. The MN may send/transmit the message when the selected candidate PSCell is not a candidate PSCell residing in the source SN. The MN may send the message to indicate/specify/instruct the release of resources of the source SN. Responsive to receiving the message, the source SN may stop providing user data (or other information) to the wireless communication device. In some embodiments, the another Xn interface or X2 interface message may comprise a SN release message, a SN change confirm message, and/or other messages.

In some embodiments, the source SN may send/transmit a request to the MN. The request may comprise a request for a reference number of cells (e.g., total or additional number of cells) allowed to be configured as candidate cells for a CPAC procedure. The SN may send the request if the SN requires/desires more candidate cells. The SN may send the request prior to initiating/triggering the MN initiated or SN initiated CPAC procedure. In some embodiments, an RRC message (or other messages) may include the reference number of cells. Another Xn interface or X2 interface message may include/provide the RRC message. In some embodiments, the MN may determine whether to accept or reject the reference number of cells in the request.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method, comprising:

sending, by a master node (MN) to a target secondary node (SN), an indication of a maximum number of candidate primary cells in a secondary cell group (PSCells) that can be configured by the target SN, in an SN addition request message;

receiving, by the MN from the target SN, an SN addition request acknowledge message with at least one candidate PSCell configuration, in response to the SN addition request message;

sending, by the MN to a wireless communication device, a radio resource control (RRC) message including the at least one candidate PSCell configuration and one or more associated conditional PSCell addition or change (CPAC) execution conditions, to cause the wireless communication device to perform a CPAC procedure to the target SN when a candidate PSCell satisfies the one or more associated CPAC execution conditions; and sending, by the MN to a source SN if data forwarding is to take place, a data forwarding message with an indication that the data forwarding is for a CPAC based procedure.

2. The method of claim 1, wherein the indication of the maximum number of candidate PSCells is included in an information element of the SN addition request message, wherein the indication that the data forwarding is for the CPAC procedure is included in an information element of the data forwarding message.

3. The method of claim 1, wherein the wireless communication device selects a candidate PSCell, to perform a CPAC procedure to the selected candidate PSCell.

4. The method of claim 3, comprising:

receiving, by the MN from the wireless communication device, a RRC message indicating execution of the CPAC procedure to the selected candidate PSCell; and sending, by the MN responsive to the RRC message, a Xn interface or X2 interface message to one or more candidate SNs other than the target SN, to release resources reserved for the CPAC procedure.

5. The method of claim 4, comprising:

sending, by the MN to the source SN, an SN release message, to indicate release of resources of the source SN and cause the source SN to stop providing user data to the wireless communication device.

6. The method of claim 1, comprising:

sending, by the MN (302A) to the source SN (302B) via a Xn interface or X2 interface message, an indication of a maximum number of cells allowed to be configured as candidate cells for the CPAC procedure, wherein the CPAC procedure is initiated by the source SN.

7. The method of claim 6, wherein the indication of a maximum number of cells is included in a RRC message included in the Xn interface or X2 interface message, wherein the RRC message is a CG-ConfigInfo message.

8. A method, comprising:

receiving, by a target secondary node (SN) from a master node (MN), an indication of a maximum number of candidate primary cells in a secondary cell group (PSCells) that can be configured by the target SN, in an SN addition request message; and sending, by the target SN to the MN, an SN addition request acknowledge message with at least one candidate PSCell configuration, in response to the SN addition request message, wherein the MN sends a radio resource control (RRC) message to a wireless communication device, the RRC message including the at least one candidate PSCell configuration and one or more associated conditional PSCell addition or change (CPAC) execution conditions, to cause the wireless communication device to perform a CPAC procedure to the target SN when a candidate PSCell satisfies the one or more associated CPAC execution conditions, wherein the MN sends, if data forwarding is to take place, a data forwarding message to a source SN with an indication that the data forwarding is for a CPAC based procedure.

9. The method of claim 8, wherein the indication of the maximum number of candidate PSCells is included in an information element of the SN addition request message, and wherein the indication that the data forwarding is for the CPAC procedure is included in an information element of the data forwarding message.

10. The method of claim 8, wherein the wireless communication device selects a candidate PSCell, to perform a CPAC procedure to the selected candidate PSCell.

11. The method of claim 10, wherein the MN receives a RRC message from the wireless communication device, the RRC message indicating execution of the CPAC procedure to the selected candidate PSCell, and sends, responsive to the RRC message, a Xn interface or X2 interface message to one or more candidate SNs other than the target SN, to release resources reserved for the CPAC procedure.

12. The method of claim 11, wherein the MN sends an SN release message to the source SN, to indicate release of resources of the source SN and cause the source SN to stop providing user data to the wireless communication device.

13. The method of claim 8, wherein the MN sends to the source SN via a Xn interface or X2 interface message, an indication of a maximum number of cells allowed to be configured as candidate cells for the CPAC procedure, wherein the CPAC procedure is initiated by the source SN.

14. The method of claim 13, wherein the indication of a maximum number of cells is included in a RRC message included in the Xn interface or X2 interface message, wherein the RRC message is a CG-ConfigInfo message.

15. A master node (MN), comprising:

at least one processor configured to:

send, via a transceiver to a target secondary node (SN), an indication of a maximum number of candidate primary cells in a secondary cell group (PSCells) that can be configured by the target SN, in an SN addition request message;

receive, via the transceiver from the target SN, an SN addition request acknowledge message with at least one candidate PSCell configuration, in response to the SN addition request message;

send, via the transceiver to a wireless communication device, a radio resource control (RRC) message including the at least one candidate PSCell configuration and one or more associated conditional PSCell addition or change (CPAC) execution conditions, to cause the wireless communication device to perform a CPAC procedure to the target SN when a candidate PSCell satisfies the one or more associated CPAC execution conditions;

send, to a source SN if data forwarding is to take place, a data forwarding message with an indication that the data forwarding is for a CPAC based procedure.

16. A target secondary node (SN), comprising:

at least one processor configured to:

receive, via a transceiver from a master node (MN), an indication of a maximum number of candidate primary cells in a secondary cell group (PSCells) that can be configured by the target SN, in an SN addition request message; and send, via the transceiver to the MN, an SN addition request acknowledge message with at least one candidate PSCell configuration, in response to the SN addition request message, wherein the MN sends a radio resource control (RRC) message to a wireless communication device, the RRC message including the at least one candidate PSCell configuration and one or more associated conditional PSCell addition or change (CPAC) execution conditions, to cause the wireless communication device to perform the CPAC procedure to the target SN when a candidate PSCell satisfies the one or more associated CPAC execution conditions, wherein the MN sends, if data forwarding is to take place, a data forwarding message to a source SN with an indication that the data forwarding is for a CPAC based procedure.

17. The MN of claim 15, wherein the indication of the maximum number of candidate PSCells is included in an information element of the SN addition request message, and wherein the indication that the data forwarding is for the CPAC procedure is included in an information element of the data forwarding message.

18. The MN of claim 15, wherein the wireless communication device selects a candidate PSCell, to perform the CPAC procedure to the selected candidate PSCell, wherein the at least one processor is further configured to:

receive, via the transceiver from the wireless communication device, a RRC message indicating execution of the CPAC procedure to the selected candidate PSCell; and send, via the transceiver responsive to the RRC message, a Xn interface or X2 interface message to one or more candidate SNs other than the target SN, to release resources reserved for the CPAC procedure.

19. The MN of claim 18, wherein the at least one processor is further configured to:

send, via the transceiver to the source SN, an SN release message, to indicate release of resources of the source SN and cause the source SN to stop providing user data to the wireless communication device.

20. The MN of claim 15, wherein at the at least one processor is configured to:

send, to the source SN (302B) via a Xn interface or X2 interface message, an indication of a maximum number of cells allowed to be configured as candidate cells for the CPAC procedure, wherein the CPAC procedure is initiated by the source SN, wherein the indication of a maximum number of cells is included in a RRC message included in the Xn interface or X2 interface message, wherein the RRC message is a CG-ConfigInfo message.

* * * * *